United States Patent [19]
Kyouno et al.

[11] Patent Number: 6,087,960
[45] Date of Patent: Jul. 11, 2000

[54] ACCIDENT SOUND DETECTION CIRCUIT

[75] Inventors: Noboru Kyouno, Tokyo; Makoto Koura; Toshimitsu Seri, both of Nagasaki, all of Japan

[73] Assignee: Mitsubishi Electric Engineering Company, Limited, Nagasaki, Japan

[21] Appl. No.: 09/328,794

[22] Filed: Jun. 9, 1999

Related U.S. Application Data

[62] Division of application No. 09/103,311, Jun. 24, 1998, Pat. No. 5,990,801.

[51] Int. Cl.⁷ ........................................... G08G 1/00
[52] U.S. Cl. ................ 340/902; 340/906; 340/937; 340/907; 340/916; 340/903; 340/905
[58] Field of Search ........................ 340/902, 906, 340/937, 907, 916, 903, 905

[56] References Cited

U.S. PATENT DOCUMENTS

| | | | |
|---|---|---|---|
| 4,023,017 | 5/1977 | Ceseri | 235/150.24 |
| 4,337,642 | 7/1982 | Yoshida | 74/35 |
| 4,806,931 | 2/1989 | Nelson | 340/907 |
| 4,864,297 | 9/1989 | Shaw et al. | 340/902 |
| 5,572,201 | 11/1996 | Graham et al. | 340/902 |
| 5,677,689 | 10/1997 | McArthur | 340/906 |
| 5,710,555 | 1/1998 | McConell et al. | 340/916 |
| 5,717,391 | 2/1998 | Rodriguez | 340/937 |
| 5,784,007 | 7/1998 | Pepper | 340/933 |
| 5,956,463 | 9/1999 | Patrick et al. | 395/2.41 |

FOREIGN PATENT DOCUMENTS

| | | | |
|---|---|---|---|
| 3027103 | 1/1981 | Germany | G01L 23/22 |
| 4343403 | 6/1995 | Germany | G01H 17/00 |
| 19814117 | 10/1998 | Germany | G01H 17/00 |
| 62-091092 | 4/1987 | Japan | H04N 7/18 |
| 4338900 | 11/1992 | Japan | G08G 1/00 |
| 4344421 | 12/1992 | Japan | G01D 9/00 |
| 8263785 | 10/1996 | Japan | G08G 1/00 |
| 9245285 | 9/1997 | Japan | G08G 1/00 |
| 1011691 | 1/1998 | Japan | G08G 1/00 |
| 1011694 | 1/1998 | Japan | G08G 1/09 |
| 101691 | 1/1998 | Japan | C11C 3/00 |
| 10142042 | 5/1998 | Japan | G01H 3/08 |
| 10162277 | 6/1998 | Japan | G08B 25/00 |
| 2323925 | 10/1998 | United Kingdom | G01H 3/10 |

*Primary Examiner*—Daniel J. Wu
*Assistant Examiner*—Tai T. Nguyen
*Attorney, Agent, or Firm*—Leydig, Voit & Mayer

[57] ABSTRACT

An accident sound detection circuit includes an accident sound detection block that detects an accident sound from a sound signal inputted from an environmental sound detection unit and outputs an accident sound detection signal a power spectrum calculator for obtaining a power spectrum in regard to a sound signal when acquiring the accident sound detection signal outputted from the accident sound detection block as a trigger signal, a spectrum pattern calculator for forming a pattern of the power spectrum, and a pattern comparator circuit for comparing the formed spectrum pattern and a set pattern set in a pattern generating circuit beforehand and generating a final accident sound detection signal if the patterns coincide with each other.

3 Claims, 21 Drawing Sheets

INPUT SIGNAL

OUTPUT OF WAVEFORM SHAPING CIRCUIT

OUTPUT OF A/D CONVERTER

DIFFERENTIAL SIGNAL

BEFORE SMOOTHING

AFTER SMOOTHING

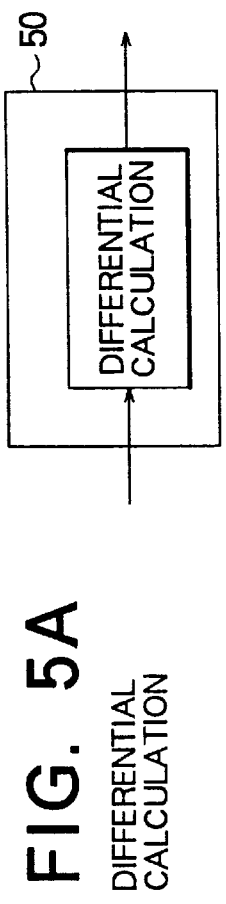
FIG. 5A DIFFERENTIAL CALCULATION
FIG. 5B DIFFERENTIAL CALCULATION (ABSOLUTE VALUE)
FIG. 5C DIFFERENTIAL CALCULATION (LOGARITHMIC VALUE)
FIG. 5D DIFFERENTIAL CALCULATION (ABSOLUTE VALUE + LOGARITHMIC VALUE)

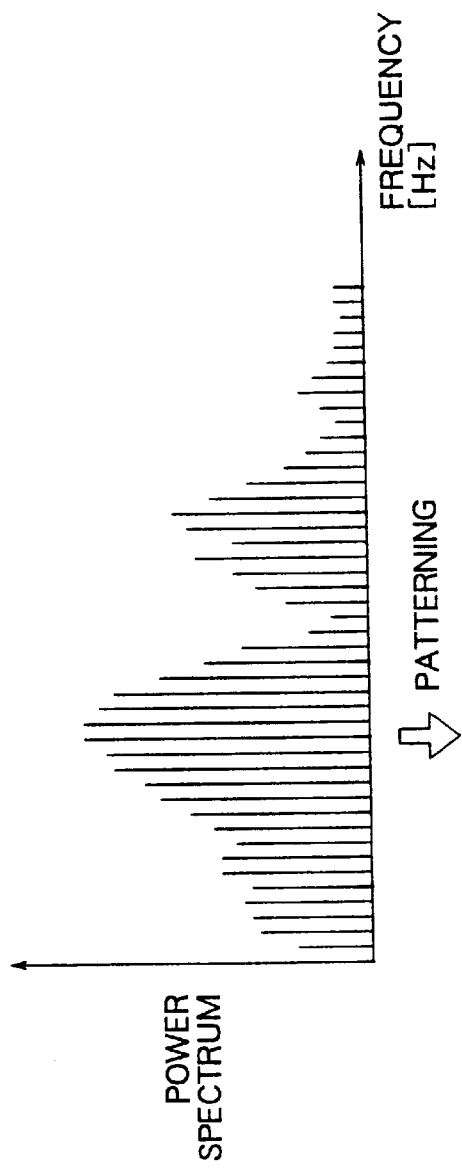
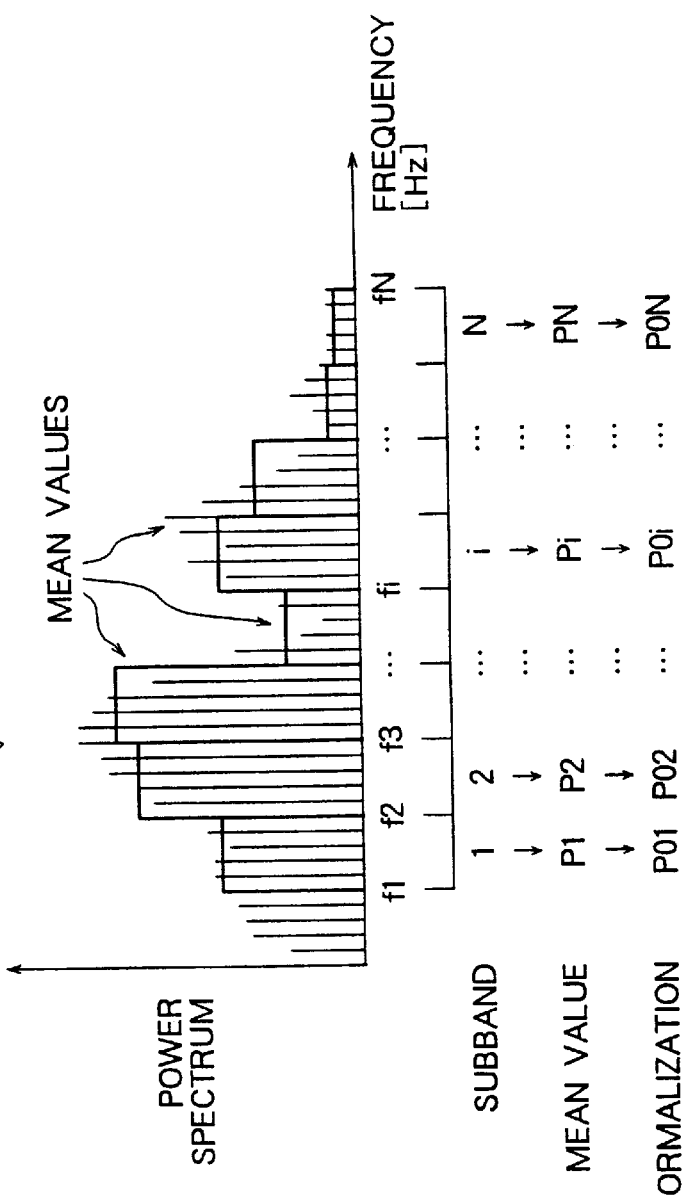
FIG. 10A
POWER SPECTRUM
FIG. 10B
PATTERN CALCULATION

PATTERN 1

| | SBN | ... | | SBi | | | SB2 | SB1 |
|---|---|---|---|---|---|---|---|---|
| COR2 | (1,1) | (1,1) | (0,1) | (1,1) | (0,1) | (1,1) | (1,1) | (0,1) |
| COR1 | (1,0) | (1,0) | (0,0) | (1,0) | (0,0) | (1,0) | (1,0) | (0,0) |

PATTERN 2

| | SBN | ... | | SBi | | | SB2 | SB1 |
|---|---|---|---|---|---|---|---|---|
| COR2 | (1,1) | (0,1) | (1,1) | (1,1) | (1,1) | (0,1) | (1,1) | (1,1) |
| COR1 | (1,0) | (0,0) | (1,0) | (1,0) | (1,0) | (0,0) | (1,0) | (1,0) |

COMPARISON

SET PATTERN

| | SBN | ... | | SBi | | | SB2 | SB1 |
|---|---|---|---|---|---|---|---|---|
| COR2 | (1,1) | (0,1) | (1,1) | (1,1) | (1,1) | (0,1) | (1,1) | (1,1) |
| COR1 | (1,0) | (0,0) | (1,0) | (1,0) | (1,0) | (0,0) | (1,0) | (1,0) |

|  | TLN | ... | | TL1 |
|---|---|---|---|---|
| COR2 | (1,1) | (1,1) | (0,1) | (1,1) |
| COR1 | (1,0) | (1,0) | (0,0) | (1,0) |

PATTERN 1

|  | TLN | ... | | TL1 |
|---|---|---|---|---|
| COR2 | (1,1) | (1,1) | (1,1) | (0,1) |
| COR1 | (1,0) | (1,0) | (1,0) | (0,0) |

PATTERN 2

COMPARISON

|  | TLN | ... | | TL1 |
|---|---|---|---|---|
| COR2 | (1,1) | (1,1) | (1,1) | (0,1) |
| COR1 | (1,0) | (1,0) | (1,0) | (0,0) |

SET PATTERN

ACCIDENT SOUND DETECTION CIRCUIT

This disclosure is a division of patent application Ser. No. 09/103,311, filed on Jun. 24, 1998, now U.S. Pat. No. 5,990,801.

BACKGROUND OF THE INVENTION

1. Field of the Invention

The present invention relates to an accident sound detection circuit for efficiently detecting only an accident sound including an accident sound caused by clash of cars and the like and a heavy-braking sound leading to an accident from traffic sounds in an intersection and the like.

2. Description of Related Art

Generally speaking, many traffic accidents happen at an intersection, and hence recording apparatus of traffic accident conditions that record conditions of happened accidents have been proposed. FIG. 21 is a block diagram of, for example, a conventional recording apparatus of traffic accident conditions that is disclosed in Japanese Patent Laid-Open No. 4-338900. In the Figure, numerals 1 and 4 show traffic signals that are allocated at an intersection and have respective signal lamps 1B, 1Y, 1R, 4B, 4Y, and 4R. In addition, 3 is a signal lamp lighting controller sending lighting control signals to respective signal lamps 1B, 1Y, 1R, 4B, 4Y, and 4R via signal lines 2B, 2Y, and 2R, and 5 is a signal lamp symbol generating block that fetches signal lighting condition signals from the signal lamp lighting controller unit 3 and outputs a signal of a color symbol showing a lighting color. Moreover, 6 is a time character generating block generating characters displaying time information (for example, 00:00:00 (o'clock:minutes:seconds)) by coinciding with real time.

Numeral 8 shows an image pickup unit that is used for taking a picture of the vicinity of the intersection and outputs a picture signal. Furthermore, 7 is an adding block that adds signals outputted from the signal lamp symbol generating block 5, time character generating block 6, and image pickup unit 8 and generates a picture signal of the vicinity of the intersection including time and signal lamp lighting conditions. Numeral 10 is an environmental sound detection unit detecting a traffic sound around the intersection, and 9 is an endless recording unit updating and recording the traffic sounds, detected by the environmental sound detection unit 10, and the picture signals, generated by the adding block 7, every determined time.

Numeral 11 is a clash (accident) sound detection circuit judging from the traffic sound detected by the environmental sound detection unit 10 whether it is a clash sound when a car clashes with something or just before it clashes. Further, 12 is a recording control unit that outputs the picture signal and traffic sound before judgement from the endless recording unit 9 to a magnetic recording control unit 13 when a clash sound is judged and makes them recorded. Furthermore, 13a and 13b are output terminals for outputting contents, recorded in the magnetic recording control unit 13, to a magnetic recording and playback unit not shown.

Next, an outline of operation of a conventional apparatus will be described. A sound signal in the vicinity of an intersection is detected by the environmental sound detection unit 10, and is sent to the clash sound detection circuit 11. The clash sound detection circuit 11 discriminates whether the detected sound signal is a clash sound, and if it does that the sound is a clash sound, a clash sound detection signal is sent to the recording control unit 12. The recording control unit 12 records a picture signal and an environmental sound before the clash sound is discriminated by reading a picture signal and an environmental sound from the endless recording unit 9 according to the clash sound detection signal that is sent and recording them in the magnetic recording control unit 13.

In regard to the judgement of whether a detected traffic sound is an accident (clash) sound, the clash sound detection circuit 11 judges the sound to be a clash sound if the level of the inputted sound signal is equal to or more than a predetermined threshold level when the level of the sound is compared with the threshold level. In addition, as a measure against malfunctions, a directional microphone is used in the environmental sound detection unit 10, and hence the microphone does not catch sound signals from places except the intersection. Furthermore, sound signals are inputted after passing through a band-pass filter excluding frequency bands except clash sounds.

BRIEF SUMMARY OF THE INVENTION

Object of the Invention

A conventional recording apparatus of traffic accident conditions compares a level of a detected sound signal to a predetermined fixed threshold level in a clash sound detection circuit for discrimination of an accident sound including a clash sound as described above, and judges detection of the clash sound when the level of the sound signal exceeds the threshold level. There, however, are many traffic sounds having high levels, besides clash sounds such as a heavy-braking sound, an alarm horn, and a runaway sound among common traffic sounds.

For that reason, a method of detecting a clash sound by comparing the level of a detected sound signal to a fixed threshold level has a problem of detecting many other high-level traffic sounds besides an actual clash sound as a clash sound. In addition, in regard to a detected clash sound, the method has another problem that it is not possible to obtain the information relating to the kind of a sound such as the information of whether the detected sound is an actual clash sound or a heavy-braking sound just before a clash, and hence there is a limitation on the accuracy of detecting an accident sound.

The present invention is intended to solve above-mentioned problems. The object of the present invention is to provide an accident sound detection circuit that does not use a threshold level for discrimination of an accident sound, performs the first discrimination of the accident sound by using a differential signal of an inputted sound signal, fetches the sound signal by further setting this discrimination result as a trigger signal, and can efficiently and selectively detect the traffic accident sound by performing second: discrimination of the accident sound through comparing three-dimensional patterns by using a power spectrum, auto-correlation, signal duration, or the like.

SUMMARY OF THE INVENTION

The present invention is an accident sound detection circuit for detecting an accident sound by using a sound signal from an environmental sound detection unit located in the vicinity of an intersection and a road. The circuit comprises an A/D converter converting the sound signal from the environmental sound detection unit into a digital signal, a differential calculation means for acquiring a differential signal out of an output signal of this A/D converter, a reference differential value generating circuit setting a reference differential value beforehand, and a comparator circuit comparing an acquired differential signal to the set reference differential value, detecting an accident sound on the basis of the comparison result, and generating an accident sound detection signal.

The present invention provides smoothing means for smoothing an output signal from the A/D converter, and a differential calculation means acquires a differential signal out of an output signal of the smoothing means.

The present invention comprises an absolute value calculation circuit performing absolute value conversion of a differential signal so that the differential signal may become positive by performing absolute value calculation of the differential signal.

The present invention comprises a logarithmic value calculation circuit performing logarithmic conversion of a differential signal by performing logarithmic calculation of the differential signal.

The present invention comprises a logarithmic value calculation circuit performing logarithmic conversion of this absolute value by performing logarithmic calculation of an absolute value of a differential signal.

The present invention comprises power spectrum calculation means for obtaining a power spectrum of a digitized sound signal through receiving an output signal of an A/D converter when an accident sound detection signal is inputted, spectrum pattern calculation means for calculating a pattern of this power spectrum and forming a spectrum pattern, a pattern generating circuit setting beforehand a spectrum pattern of a sound signal for discriminating an accident sound, and a pattern comparator circuit comparing the set spectrum pattern and the formed spectrum pattern and generating a final accident sound detection signal when both spectrum patterns coincide with each other.

The spectrum pattern calculation means in the present invention comprises frequency domain separation means for separating frequency components of the spectrum into a plurality of subbands, mean value calculation means for obtaining a mean value of the frequency component in each subband, normalization means for normalizing the level of this mean value so as to uniformly compare the level to various accident sounds, and patterning calculation means for patterning normalized mean values.

The present invention comprises the auto-correlation calculation means for obtaining the auto-correlation of a digitized sound signal through receiving an output signal of an A/D converter when an accident sound detection signal is inputted, a correlation reference value generating circuit for setting beforehand an auto-correlation reference value of a sound signal for discriminating an accident sound, and a comparator circuit comparing the set auto-correlation reference value and the obtained auto-correlation and generating a final accident sound detection signal according to the comparison result of this obtained auto-correlation and the reference value.

The present invention comprises signal duration calculation means for obtaining signal duration of a digitized sound signal through receiving an output signal of an A/D converter when an accident sound detection signal is inputted, a reference time setting circuit setting beforehand a reference value of signal duration of sound signals for discriminating an accident sound, a comparator circuit generating a final accident sound detection signal according to the comparison result of the obtained signal duration and the set signal duration.

The present invention comprises power spectrum calculation means for obtaining a power spectrum of a digitized sound signal through receiving an output signal of an A/D converter when an accident sound detection signal is inputted, spectrum pattern calculation means for forming a pattern of this power spectrum, auto-correlation calculation means for obtaining auto-correlation of the digitized sound signal, auto-correlation pattern calculation means for forming a pattern of this auto-correlation, a pattern generating circuit setting beforehand the spectrum pattern of a sound signal for discriminating an accident sound and an auto-correlation pattern, and a pattern comparator circuit comparing each of the set patterns and each of the formed patterns and generating a final accident sound detection signal when each of the formed patterns coincides with each of the set patterns.

The present invention comprises power spectrum calculation means for obtaining a power spectrum of a digitized sound signal through receiving an output signal of an A/D converter when an accident sound detection signal is inputted, spectrum pattern calculation means for forming a pattern of this power spectrum, signal duration calculation means for obtaining the signal duration of the digitized sound signal, signal duration pattern calculation means for forming a pattern of the signal duration, a pattern generating circuit setting beforehand the spectrum pattern of a sound signal for discriminating an accident sound and a pattern of signal duration, and a pattern comparator circuit comparing each of these set patterns and each of the formed patterns and generating a final accident sound detection signal when each of these formed patterns coincides with each of the set patterns.

The present invention comprises the auto-correlation calculation means for obtaining the auto-correlation of a digitized sound signal through receiving an output signal of an A/D converter when an accident sound detection signal is inputted, auto-correlation pattern calculation means for forming a pattern of this auto-correlation, signal duration calculation means for obtaining the signal duration of the digitized sound signal, signal duration pattern calculation means for forming a pattern of the signal duration, a pattern generating circuit setting beforehand the pattern of auto-correlation for discriminating an accident sound and a pattern of signal duration, and a pattern comparator circuit comparing each of these set patterns and each of the formed patterns and generating a final accident sound detection signal when each of these formed patterns coincides with each of the set patterns.

The present invention comprises power spectrum calculation means for obtaining a power spectrum of a digitized sound signal through receiving an output signal of an A/D converter when an accident sound detection signal is inputted, spectrum pattern calculation means for forming a pattern of this power spectrum, auto-correlation calculation means for obtaining the auto-correlation of the digitized sound signal, auto-correlation pattern calculation means for forming a pattern of this auto-correlation, signal duration calculation means for obtaining the signal duration of the digitized sound signal, signal duration pattern calculation means for forming a pattern of the signal duration, a pattern generating circuit setting beforehand the spectrum pattern of a sound signal for discriminating an accident sound, a pattern of the auto-correlation, and a pattern of signal duration, and a pattern comparator circuit comparing each of these set patterns and each of the formed patterns and generating a final accident sound detection signal when each of these formed patterns coincides with each of the set patterns.

BRIEF DESCRIPTION OF THE DRAWINGS

FIGS. 5A to 5D are functional block diagrams showing examples of differential calculation means for explaining the operation of a third embodiment;

FIG. 10 is a functional block diagram showing an example of pattern calculation for explaining the operation of the spectrum pattern calculation means in FIG. 9;

DETAILED DESCRIPTION OF THE PREFERRED EMBODIMENTS

Embodiment 1

Figure 1:
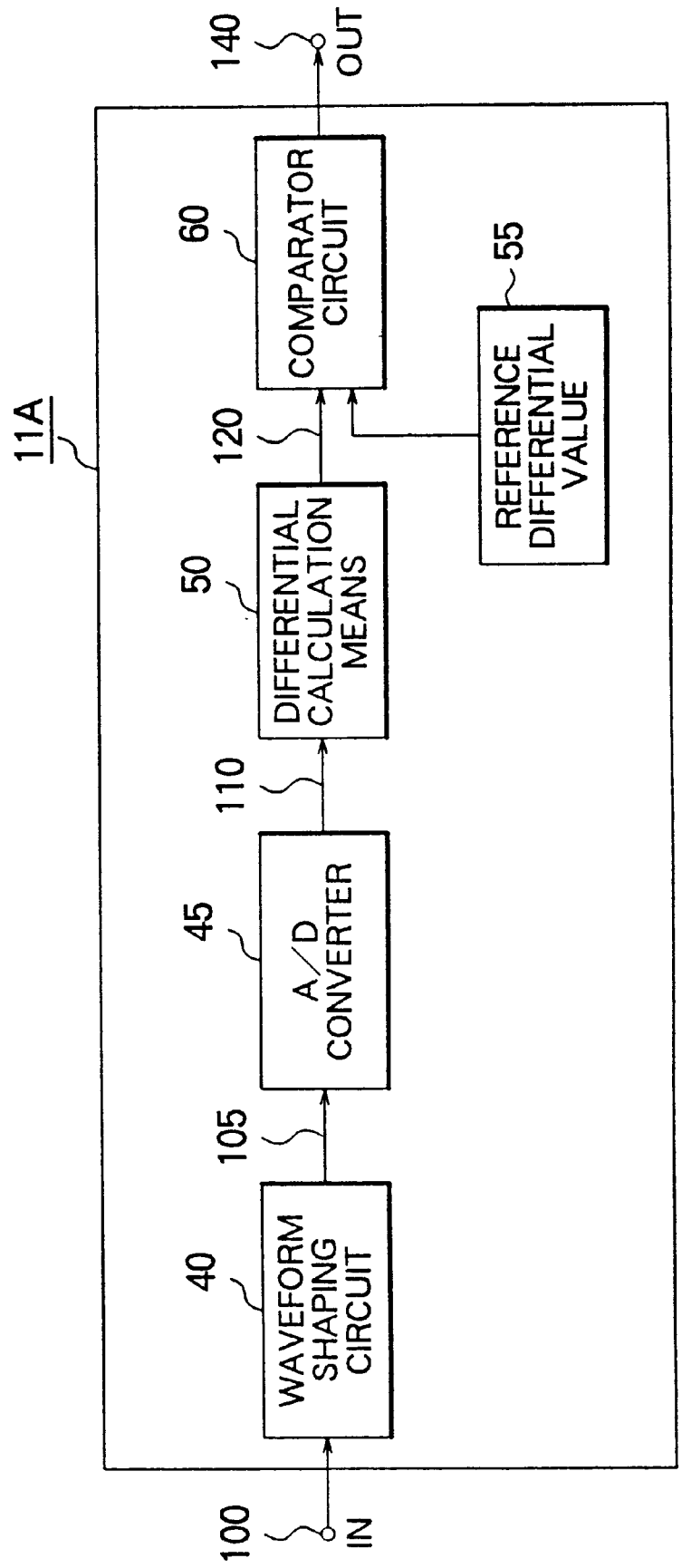
FIG. 1 is a functional block diagram showing a first embodiment of the present invention.
Figure 21:
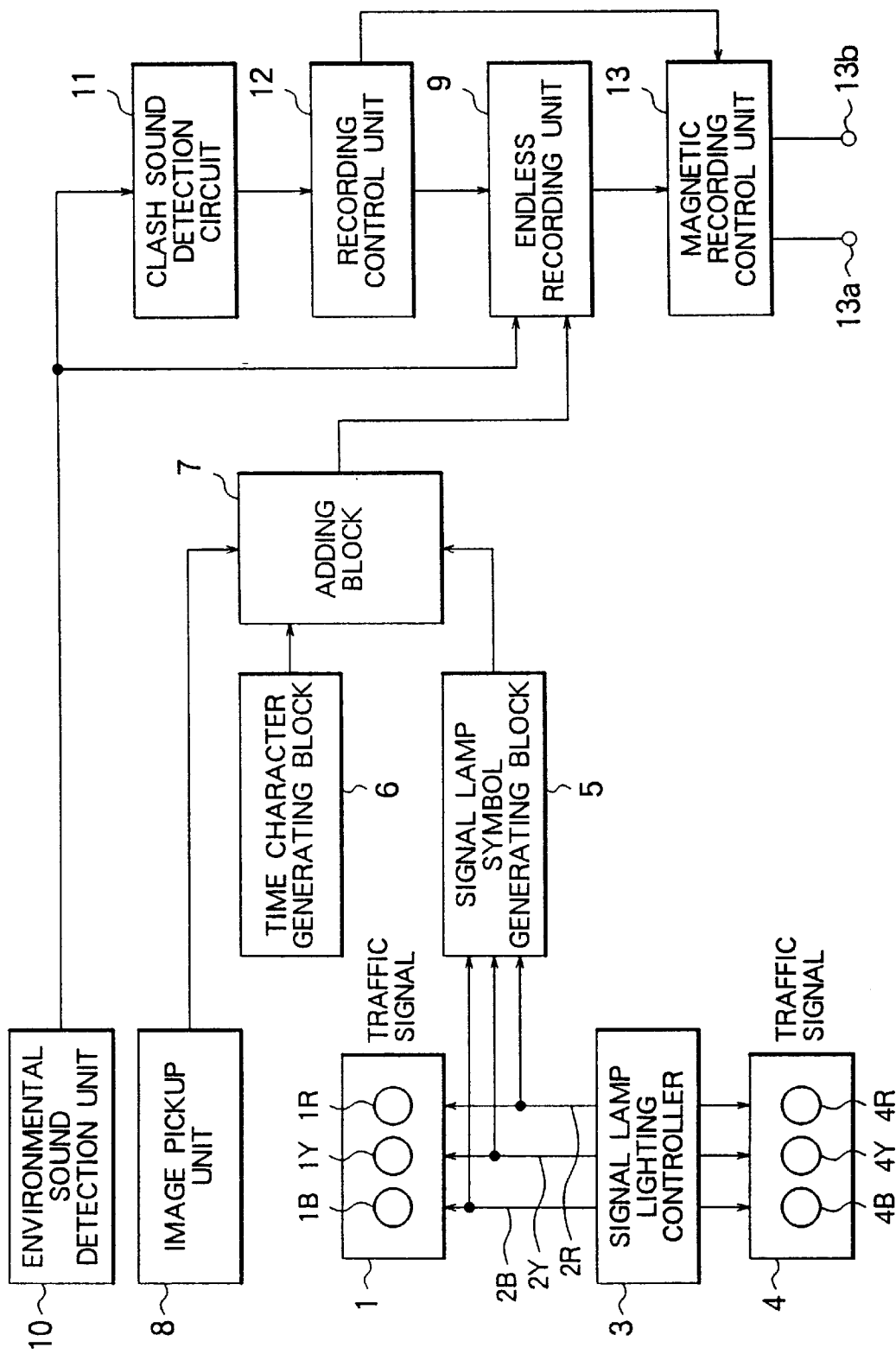
FIG. 21 is a functional block diagram showing a conventional recording apparatus of traffic accident conditions.

Hereinafter, an embodiment 1 will be described with reference to drawings. FIG. 1 is a block diagram showing the construction of an accident sound detection circuit according to this embodiment. An accident sound detection circuit 11A receives a sound signal from an environmental sound detection unit 10 as shown in FIG. 21, and outputs an accident sound detection signal to a recording control unit 12 when detecting an accident sound from the sound signal.

The accident sound detection circuit 11A comprises a waveform shaping circuit 40 shaping a waveform of a sound signal 100 inputted from the environmental sound detection unit 10 (see FIG. 21), an A/D converter 45 converting an analog sound signal 105 shaped in the waveform shaping circuit 40 into a digital signal, a differential calculation means 50 for calculating a differential value of a digital output signal 110 outputted from the A/D converter 45 and outputting a differential signal, a reference differential value generating circuit 55 setting a reference differential value that becomes a reference level and generating it as a reference differential signal, and a comparator circuit 60 comparing a differential signal 120 from the differential calculation means 50 to the reference differential signal from the reference differential value generating circuit 55 and generating an accident sound detection signal 140 if the differential value calculated by the differential calculation means 50 is larger than the set reference differential value. In addition, the waveform shaping circuit 40 is composed of, for example, a high-pass filter circuit, a band-pass filter circuit, and the like.

Next, the operation of this embodiment will be described with reference to FIGS. 1 and 2.

Figure 2A:
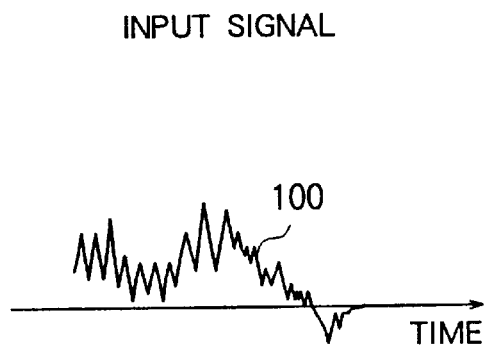
FIGS. 2A to 2D are signal waveform charts for explaining the operation of the first embodiment in FIG. 1.
Figure 2B:
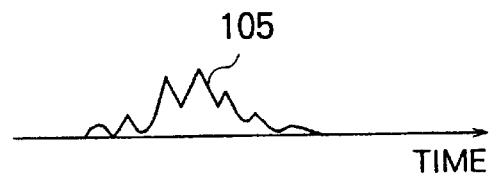

When the sound signal 100 shown in FIG. 2A occurs at the time of an accident happening, is detected by the external environmental sound detection circuit 10, and is inputted into an accident sound detection circuit 11A of FIG. 1, the unnecessary signal components of the sound signal 100 are removed by the waveform shaping circuit 40 and the sound signal 105 shown in FIG. 2B is generated.

Figure 2C:
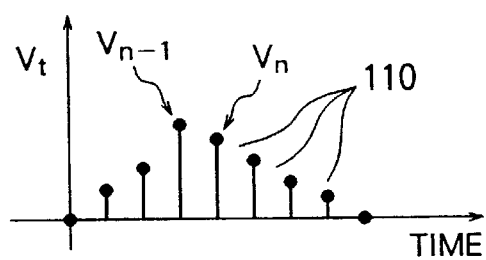
Figure 2D:
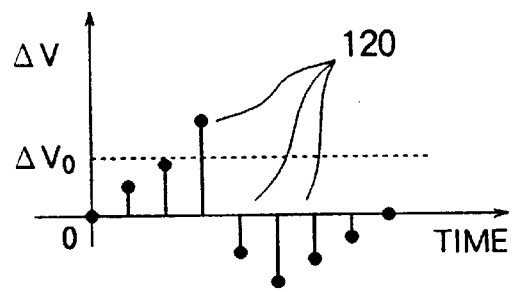

The sound signal 105 is converted from an analog signal to the digital output signal 110 by the A/D converter 45. FIG. 2C shows an example of the output signal 110, where the level of the nth signal is shown by $V_n$, and the level of the (n−1)th signal is by $V_{n-1}$. FIG. 2D shows the differential signal 120 showing a differential value of the output signal 110, that is, $\Delta V = V_n - V_{n-1}$. Generally, the differential signal 120 shows a changed portion of a signal level, and hence it becomes large as a level of the output signal 110 sharply changes. On the contrary, even if the level of the output signal is large, the level of the differential signal is small if the level change is small. Therefore, if a sudden phenomenon such as an accident happens, the level of the output signal 110 sharply changes, and hence the level of the differential signal 120 largely changes.

Then, the reference differential signal showing a reference differential value $\Delta V_0$ is generated beforehand by the reference differential value generating circuit 55 shown in FIG. 1, and the differential value $\Delta V$ outputted from the differential calculation means 50 and the reference differential value $\Delta V_0$ are compared by the comparator circuit 60. Then, if $\Delta V$ is larger than $\Delta V_0$ as shown in FIG. 2D, the accident sound detection circuit 11A judges that it detects a traffic accident sound whose signal level sharply changes, and outputs the accident sound detection signal 140 to the recording control unit 12 similarly to a conventional apparatus.

Embodiment 2

Figure 3:
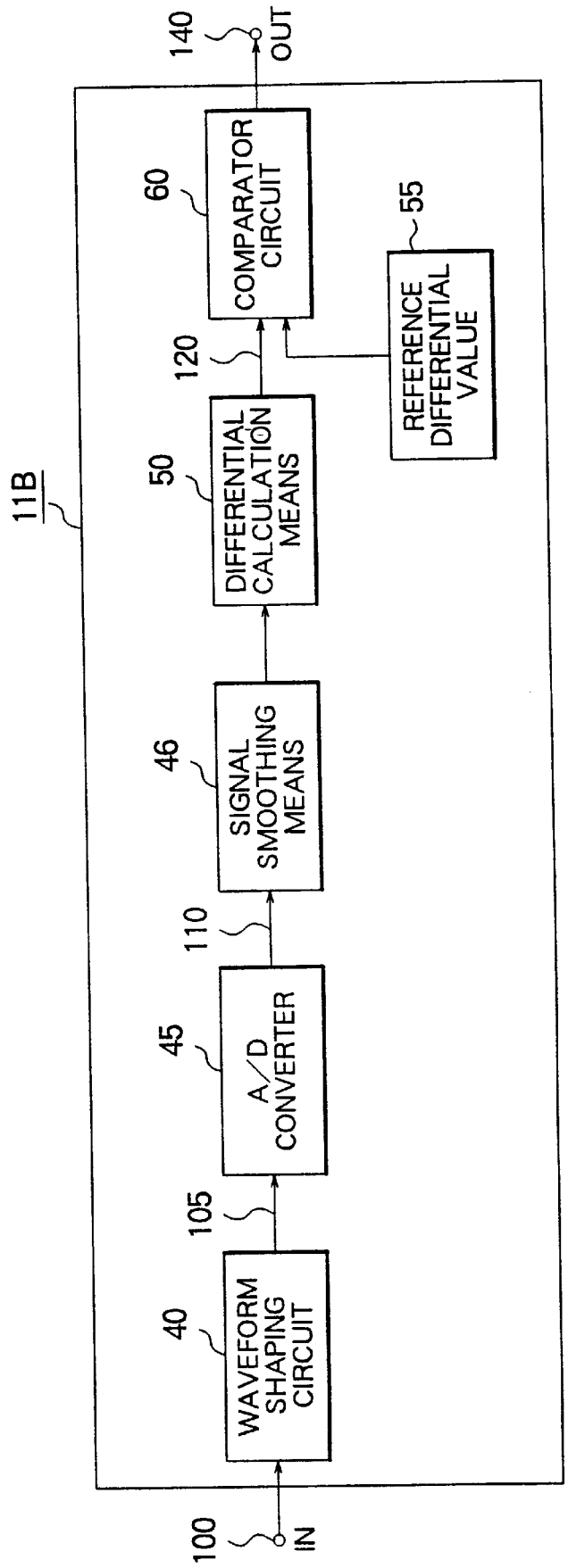
FIG. 3 is a functional block diagram showing an example of a second embodiment according to the present invention that provides signal smoothing means 46 between an A/D converter 45 and a differential calculation means 50 in an accident sound detection circuit in FIG. 1.

Although, in the above-mentioned first embodiment, the output signal 110 of the A/D converter 45 is directly inputted to the differential calculation means 50, in this embodiment, levels of the output signal 110 having large level changes are averaged and the signal 110 is inputted to the differential calculation means 50. FIG. 3 is a block diagram showing the construction of an accident sound detection circuit according to this embodiment. In addition, in the figure, the same numerals are assigned to blocks that are the same as or equivalent to those in FIG. 1. The accident sound detection circuit 11B shown in FIG. 3 has a signal smoothing means 46 provided between the A/D converter 45 and differential calculation means 50.

Figure 4A:
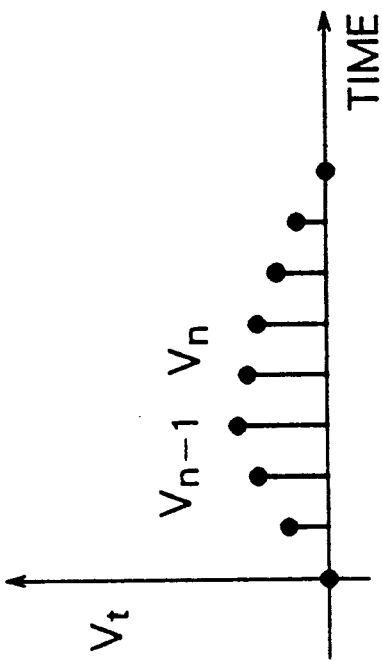
FIGS. 4A and 4B are signal waveform charts for explaining the operation of the second embodiment in FIG. 3.
Figure 4B:
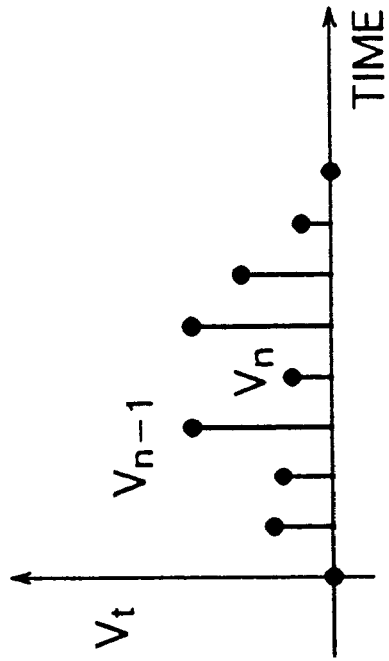

The operation of the signal smoothing means 46 is as follows. Thus, as shown in FIG. 4A, the output signal 110 is inputted from the A/D converter 45, the signal smoothing means 46 averages its signal levels. In consequence, the output signal is converted into an output signal having levels smoothly changing and outputted as shown in FIG. 4B.

Therefore, the differential signal 120 that is the result of performing the differential calculation of the output signal 110 becomes an output corresponding to the tendency portion of the signal levels. Hence, it is possible to prevent the detection failure of an accident sound caused by a sharp level change of the output signal 110 generated by some unnecessary external signal. Here, as examples of the signal smoothing means 46, a moving average circuit and a low-pass filter can be listed.

Embodiment 3

FIGS. 5A to 5D are block diagrams showing the construction of respective differential calculation means 50.

Since each of the differential calculation means 50 in the embodiments 1 and 2 (FIG. 5A) simply calculates differentials of levels of the output signal 110 that align back and forth in time series, the differential signal 120 becomes a positive and negative signal as shown in FIG. 2D. Therefore, if the reference differential value is set with reference to a positive signal, accurate detection of an accident sound may be not performed sometimes.

In order to solve such problems, the differential calculation means 50 performs the calculation of obtaining absolute values of differential values after the differential calculation of the output signal 110. FIG. 5B is a block diagram showing the construction of a differential calculation means 50A having an absolute value calculating function. In the figure, numeral 50-1 shows a differential calculation circuit, and 50-2 is an absolute value calculation circuit calculating absolute values of differential values calculated by the differential calculation circuit 50-1.

Figure 6B:
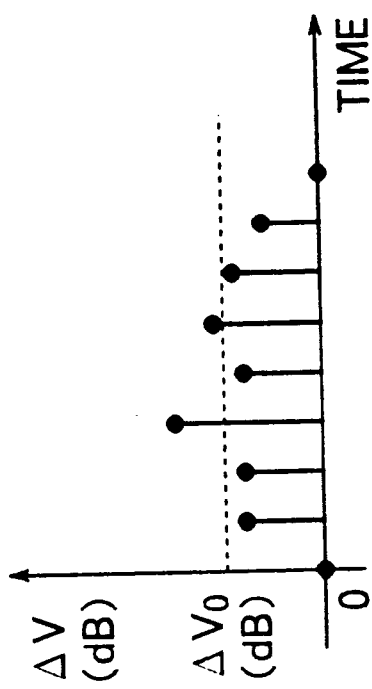
FIGS. 6A and 6B are signal waveform charts for explaining the operation of the differential calculation means in FIG. 5.
Figure 6A:
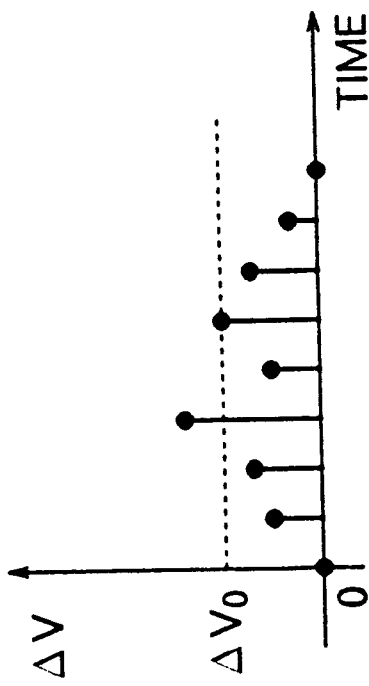

In the differential calculation means 50A, the absolute value calculation circuit 50-2 performs the absolute value calculation of the differential values calculated by the differential calculation circuit 50-1, and performs absolute value conversion of the differential signal so that the differential signal may always become positive as shown in FIG. 6A. By performing the absolute value calculation of the differential values in this manner, it is possible to easily recognize a sound signal as an accident sound even if a differential signal having large negative levels is generated.

Although the differential calculation means 50A obtains absolute values of differential values and inputs them to the comparator circuit 60, it is also good to obtain logarithmic values of differential calculation values instead of obtaining absolute values. FIG. 5C is a block diagram of a differential calculation means 50B comprising a logarithmic value calculation circuit 50-3 calculating logarithmic values of differential calculation values.

The logarithmic value calculation circuit 50-3 performs the logarithmic value calculation of the differential values from the differential calculation circuit 50-1, and outputs a differential signal having the differential values converted into logarithmic values as shown in FIG. 6B. It is possible to compare the differential signal having values converted into the logarithmic values to the identical reference value without relation to the level of the inputted signal even if the inputted signal is a small accident sound or a large one. For example, assuming that an inputted value is $V_t$ and logarithmic conversion is performed by using the formula $20LOG(V_t)$, logarithmic differential values at the time of the signal becoming twice can be compared to the reference value 6 dB irrelevantly to its signal level.

FIG. 5D is a block diagram of a differential conversion means 50C performing the absolute value calculation and logarithmic value calculation of the signal outputted from the differential calculation circuit 50-1 by using the absolute value calculation circuit 50-2 and logarithmic value calculation circuit 50-3 and converting the absolute values of the differential signal into logarithmic values. If the differential signal is converted into absolute values and logarithmic values, it is possible to easily recognize an accident sound from the inputted differential signal irrelevantly to the extent of its level and the kind of its sign. At the same time, it is possible to compare the level of the differential signal to the constant reference differential value irrelevantly to its inputted signal level.

In this third embodiment, the waveform of an inputted sound signal is shaped, and the shaped sound signal is digitized with the A/D converter 45. Furthermore, differential values are obtained directly or after passing the digital signal through the signal smoothing means 46, and an accident sound is discriminated by comparing these differential values to the preset reference differential value. Hence, it is possible to efficiently detect the accident sound.

Embodiment 4

The accident sound detection circuit according to each of the above-mentioned embodiments simply detects an accident sound on the basis of a level of the sound signal 100 detected by the detection circuit. It, however, is not possible to grasp the information of whether the detected accident sound is a clash sound or a braking sound of a vehicle(s).

An accident sound detection circuit according to this embodiment does not use a threshold level of a signal level for discrimination of an accident sound. The detection circuit performs the first discrimination of the accident sound by using a differential signal of the inputted sound signal, and acquires the accident sound by setting this discrimination result as a trigger signal. Further, the detection circuit performs the second discrimination of the accident sound, that is, identification by multidimensional pattern comparison using a power spectrum, auto-correlation and signal duration.

Figure 7:
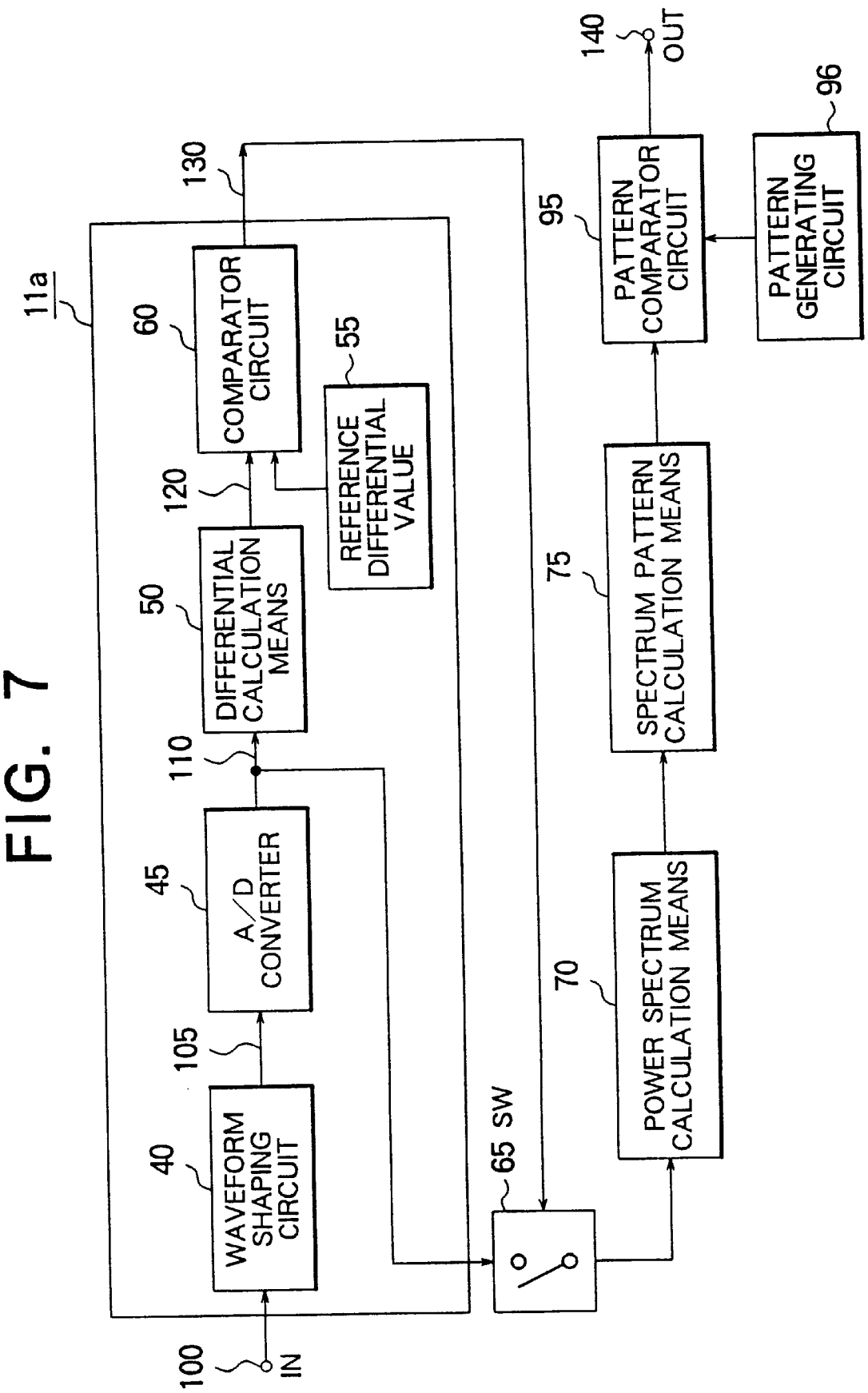
FIG. 7 is a functional block diagram showing a fourth embodiment of the present invention.

FIG. 7 is a block diagram showing the construction of an accident sound detection circuit according to this embodiment. In addition, the same numerals are assigned to blocks that are the same as or equivalent to those in FIG. 1.

In FIG. 7, numeral 11a shows an accident sound detection block (corresponding to the accident sound detection circuit 11) performing the first discrimination of an accident sound from the sound signal 100 inputted similarly to the first embodiment and outputting the accident sound detection signal 130. Further, 65 is a switch that turns on when the accident sound detection signal 130 outputted from the accident sound detection block 11a is inputted as a trigger signal and receives a divided output signal 45 of the A/D converter 45. Furthermore, 70 is power spectrum calculation means performing the power spectrum calculation of the acquired output signal 45, and 75 is spectrum pattern calculation means dividing the frequency band of a calculated power spectrum into several small domains (subbands) and generating the patterned subbands as a signal. Moreover, 96 is a pattern generating circuit generating a preset pattern as a signal according to the kind of the accident sound, and 95 is a pattern comparator circuit performing pattern comparison by comparing the signal from the pattern generating circuit 96 and the signal from the spectrum pattern calculation means 75.

Although the operation of this embodiment will be described with reference to FIG. 7, the operation of the accident sound detection block 11a is the same as that of the accident sound detection circuit 11 of the first embodiment, and hence description of it is omitted here.

The first discrimination of the inputted sound signal 100 such as an accident sound is performed by the accident sound detection block 11a, and the accident sound detection signal 130 is generated. In this time, the accident sound detection signal 130 is inputted to the switch 65 as a trigger signal turning on the switch 65, and turns on the switch 65. In consequence, the output signal 110 from the A/D converter 45 in the accident sound detection block 11a is sent to the power spectrum calculation means 70.

The power spectrum calculation means 70 saves the inputted signal in memory not shown while the calculation means 70 performs power spectrum calculation by using saved signals within a predetermined period. This calculation result is sent to the spectrum pattern calculation means 75, and a spectrum pattern is generated in regard to subbands that are divided small frequency domains.

Next, the spectrum pattern is inputted to the pattern comparator circuit 95, and is compared to a pattern preset in the pattern generating circuit 96 according to the kind of the accident sound. If the inputted spectrum pattern coincides with a pattern preset in the pattern generating circuit 96, it is judged that the inputted signal is an accident sound to be identified with the preset pattern. Then, the final accident sound detection signal 140 is outputted from the pattern comparator circuit 95.

Figure 8:
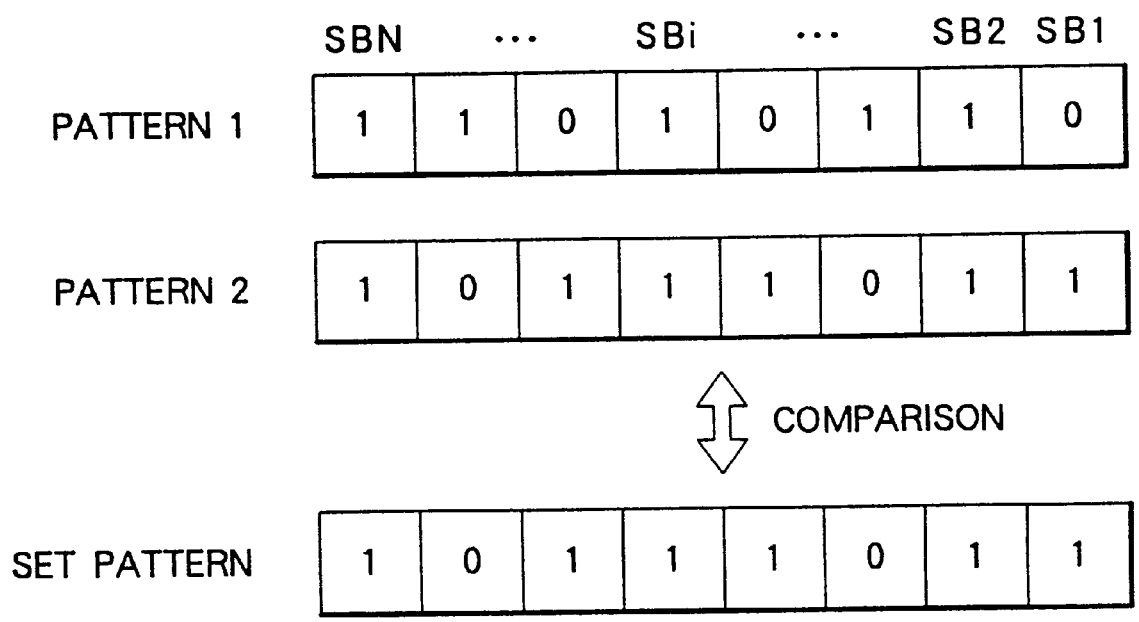
FIG. 8 is an explanatory diagram of the operation of an example embodying a pattern comparison method in a pattern comparator circuit shown in FIG. 7.

FIG. 8 is an explanatory diagram showing an example of the comparison operation of spectrum patterns inputted from the spectrum pattern calculation means 75 to the pattern comparator circuit 95 and a preset pattern. In FIG. 8, it is assumed that a subband is generally expressed as SBi (i=1, . . . , N) and a spectrum pattern inputted to the pattern comparator circuit is expressed as "101110011" (pattern 2) for the subbands. Then, the spectrum pattern coincides with the preset pattern, and hence the inputted sound is discriminated as an accident sound. On the other hand, if the spectrum pattern is expressed as "11010110" (pattern 1), the spectrum pattern is different from the preset pattern, and hence the accident sound detection signal 140 is not generated.

The reason why the discrimination of an accident sound can be performed by comparing a spectrum pattern of an inputted signal to a preset pattern is that various accident sounds generally have characteristic patterns on spectrum patterns. Therefore, it becomes possible to efficiently discriminate a sound signal having a spectrum pattern coinciding with a preset pattern as a signal including the accident sound by selecting beforehand a spectrum pattern to be detected as a preset pattern.

Figure 9:
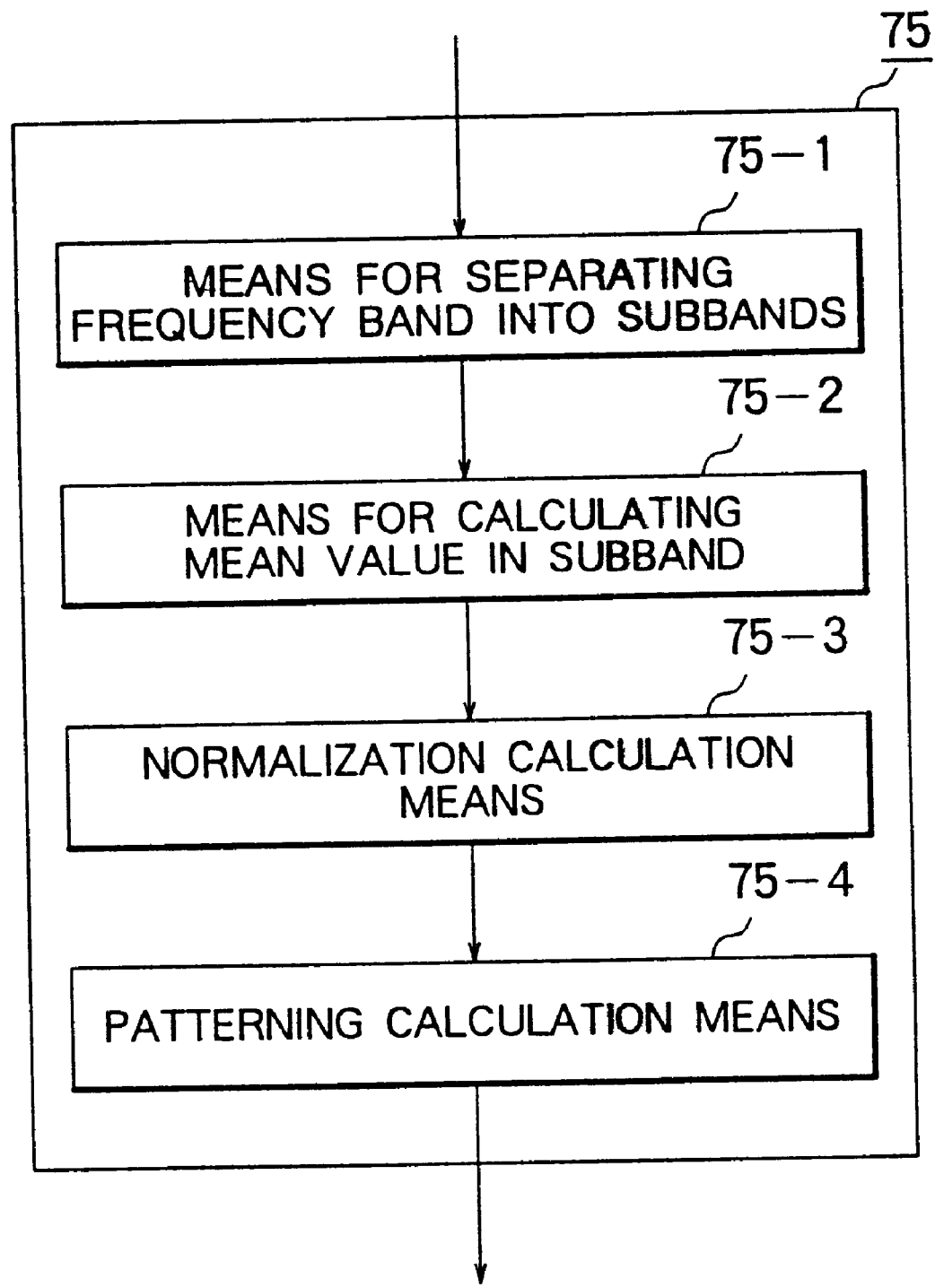
FIG. 9 is a functional block diagram showing an example of spectrum pattern calculation means for explaining the operation of the fourth embodiment in FIG. 7.

FIG. 9 is a block diagram showing an example embodying the functional construction of the spectrum pattern calculation means 75 in FIG. 7. In the Figure, numeral 75-1 shows frequency domain separation means for separating a frequency domain into subbands, 75-2 is mean value calculation means for calculating a mean value in each subband, 75-3 is normalization calculation means, and 75-4 is patterning calculation means.

Next, the operation of the spectrum pattern calculation in FIG. 9 will be described with reference to FIGS. 9 and 10. In FIG. 9, a calculated and inputted power spectrum is first divided into power spectra by the subband in the frequency domain separation means 75-1 into subbands. This state is shown in FIGS. 10A and 10B. Thus, a power spectrum in FIG. 10A is divided into subbands 1, 2, 3, . . . , N as shown in FIG. 10B.

Mean values per subband P1, P2, . . . , PN are obtained from these divided power spectra with the mean value calculation means 75-2 in each subband. Furthermore, normalization calculation is performed in the normalization calculation means 75-3 for universal comparison of the levels of mean values to various accident sounds, and normalized mean values P01, P02, . . . , P0N are obtained. This state is shown in FIG. 10B. Finally, the normalized mean values are converted into a binary pattern with the patterning calculation circuit 75-4, and the binary pattern is sent to the pattern comparator circuit 95.

In this manner, in this embodiment, as the first discrimination, an accident sound is acquired with setting the accident sound detection signal 130, outputted from the accident sound detection block 11a, as a trigger signal, and further, the content discrimination of the accident sound is performed with the second discrimination using pattern comparison of power spectra. Hence, it is possible to efficiently detect the traffic accident sound and further to selectively detect the contents of the traffic accident sound.

In addition, although, in FIG. 7, the accident sound detection circuit 11A of FIG. 1 is described instead of the accident sound detection block 11a as an example, it is also good to use the accident sound detection circuits 11B and 11C shown in FIGS. 3 and 5 if the circuit belongs to the first embodiment. Moreover, although, in FIG. 7, the power spectrum calculation means 75 receives the output signal 110 of the A/D converter 45 in the accident sound detection block 11a, the means 75 can also receive the output signal of the signal smoothing means 46 shown in FIG. 3.

Embodiment 5

Although the above-mentioned fourth embodiment discriminates an accident sound on the basis of a power spectrum of the sound signal 110 that is inputted and digitized, this embodiment performs the accident sound discrimination by performing the level comparison of an auto-correlation value of the sound signal 110 and a correlation reference value. A sound signal that is periodical and has large auto-correlation value is judged that it comes from a klaxon sound or the like, and hence it is excluded from an accident sound.

Figure 11:
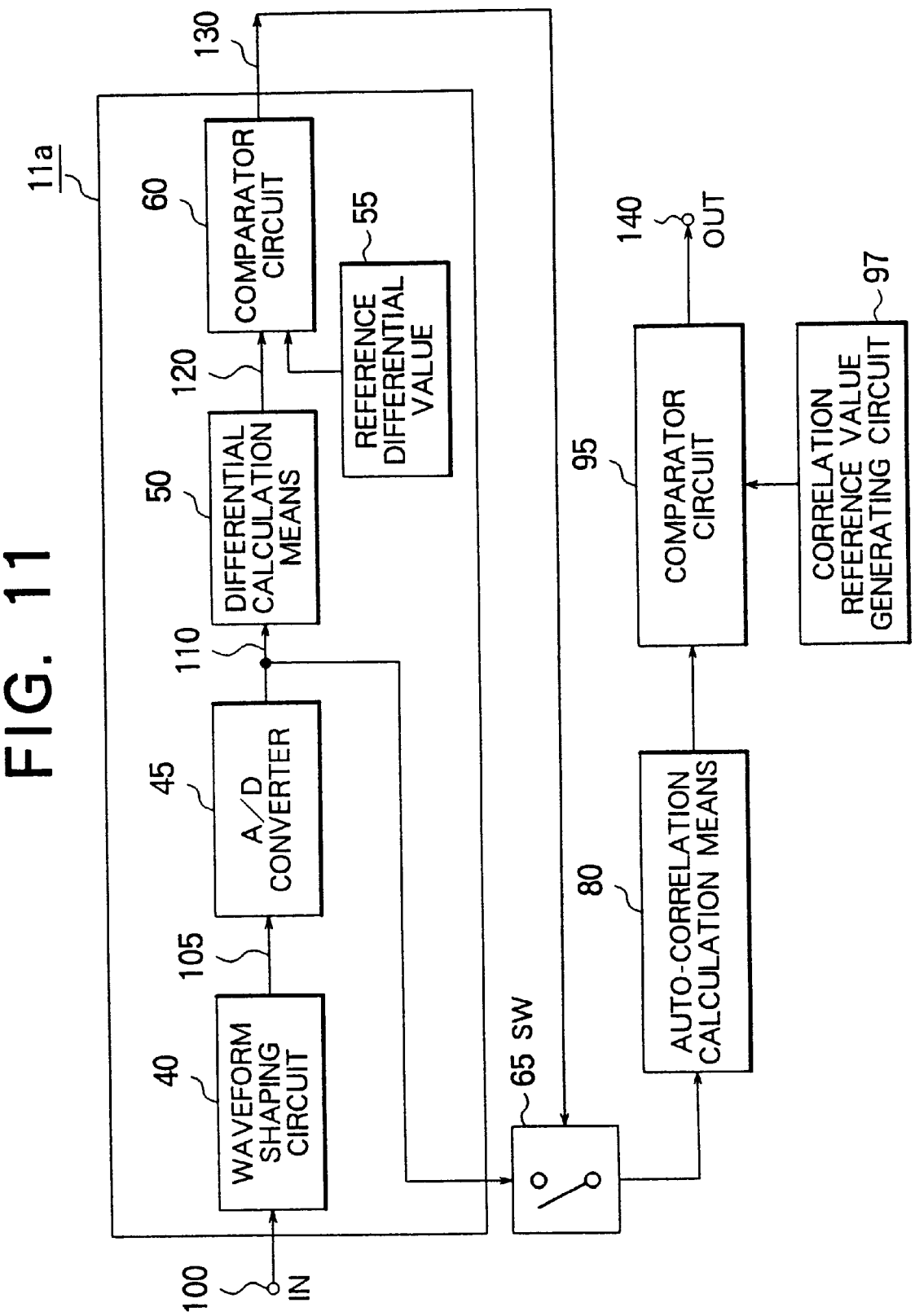
FIG. 11 is a functional block diagram showing a fifth embodiment of the present invention.

Hereinafter, this embodiment will be described with reference to FIG. 11. FIG. 11 is a block diagram showing the construction of an accident sound detection circuit according to this embodiment. In addition, in the figure, the same numerals are assigned to blocks that are the same as or equivalent to those in FIG. 7. In the figure, numeral 80 shows auto-correlation calculation means calculating and outputting an auto-correlation function or an auto-correlation coefficient of the output signal 110 acquired from the switch 65, and 97 is a correlation reference value generating circuit setting a correlation reference value beforehand according to the kind of the accident sound and generating the value as a signal. Furthermore, 95 is a comparator circuit performing the level comparison of the correlation reference value set in the correlation reference value generating circuit 97 and the auto-correlation function calculated in the auto-correlation calculation means 80.

Next, the operation of this embodiment will be described with reference to FIG. 11. Since the operation of the accident sound detection block 11a is the same as that of the accident sound detection circuit belonging to the first embodiment, the detailed description of it is omitted.

In FIG. 11, an inputted sound signal of an accident sound and the like is discriminated as an accident sound in the first discrimination using the accident sound detection block 11a, and the accident sound detection signal 130 is generated. In this time, the accident sound detection signal 130 is inputted as a trigger signal to the switch 65, and turns on the switch 65. In consequence, the output signal 110 from the A/D converter 45 in the accident sound detection block 11a is sent to the auto-correlation calculation means 80.

The auto-correlation calculation means 80 saves the inputted output signal in memory not shown while the calculation means 80 calculates an auto-correlation function or an auto-correlation coefficient by using saved signals within a predetermined period. This calculation result is inputted to the comparator circuit 95, and is compared to the correlation reference value preset in the correlation reference value generating circuit 97 according to the kind of the accident sound.

If the inputted auto-correlation function is less than the correlation reference value, it is judged that the inputted signal is the accident sound. Then, the final accident sound detection signal 140 is outputted from the pattern comparator circuit 95.

In addition, the reason why the level comparison of the auto-correlation function and correlation reference value is performed is to increase the efficiency of accident sound discrimination. Thus, since an accident sound is generally an impactive signal, an auto-correlation value is extremely low. On the other hand, for example, a klaxon sound and the like is a periodic sound, and hence it generally has a large auto-correlation value. Therefore, it is possible to efficiently discriminate the accident sound from other traffic sounds by comparing the level of the auto-correlation value to that of the correlation reference value.

In this manner, the fifth embodiment, as the first discrimination, acquires an accident sound from the accident sound detection block 11a by setting the accident sound detection signal 140 as a trigger signal, and further performs the content discrimination of the accident sound by the second discrimination using level comparison through auto-correlation. Therefore, it is possible to efficiently and selectively detect the traffic accident sound irrelevantly to a signal output level.

In addition, although, in FIG. 11, the accident sound detection circuit 11A of FIG. 1 is described instead of the accident sound detection block 11a as an example, it is also good to use the accident sound detection circuits 11B and 11C shown in FIGS. 3 and 5 if the circuit belongs to the first embodiment. Moreover, although, in FIG. 11, the auto-correlation calculation means 80 receives the output signal 110 of the A/D converter 45 in the accident sound detection block 11a, the means 80 can also receive the output signal of the signal smoothing means 46 shown in FIG. 3.

Embodiment 6

Although the fifth embodiment discriminates an accident sound by performing the level comparison of an auto-correlation value of the sound signal 110 and the correlation reference value, this embodiment discriminates the accident sound by comparing the signal duration of the sound signal 110 to reference duration.

Figure 12:
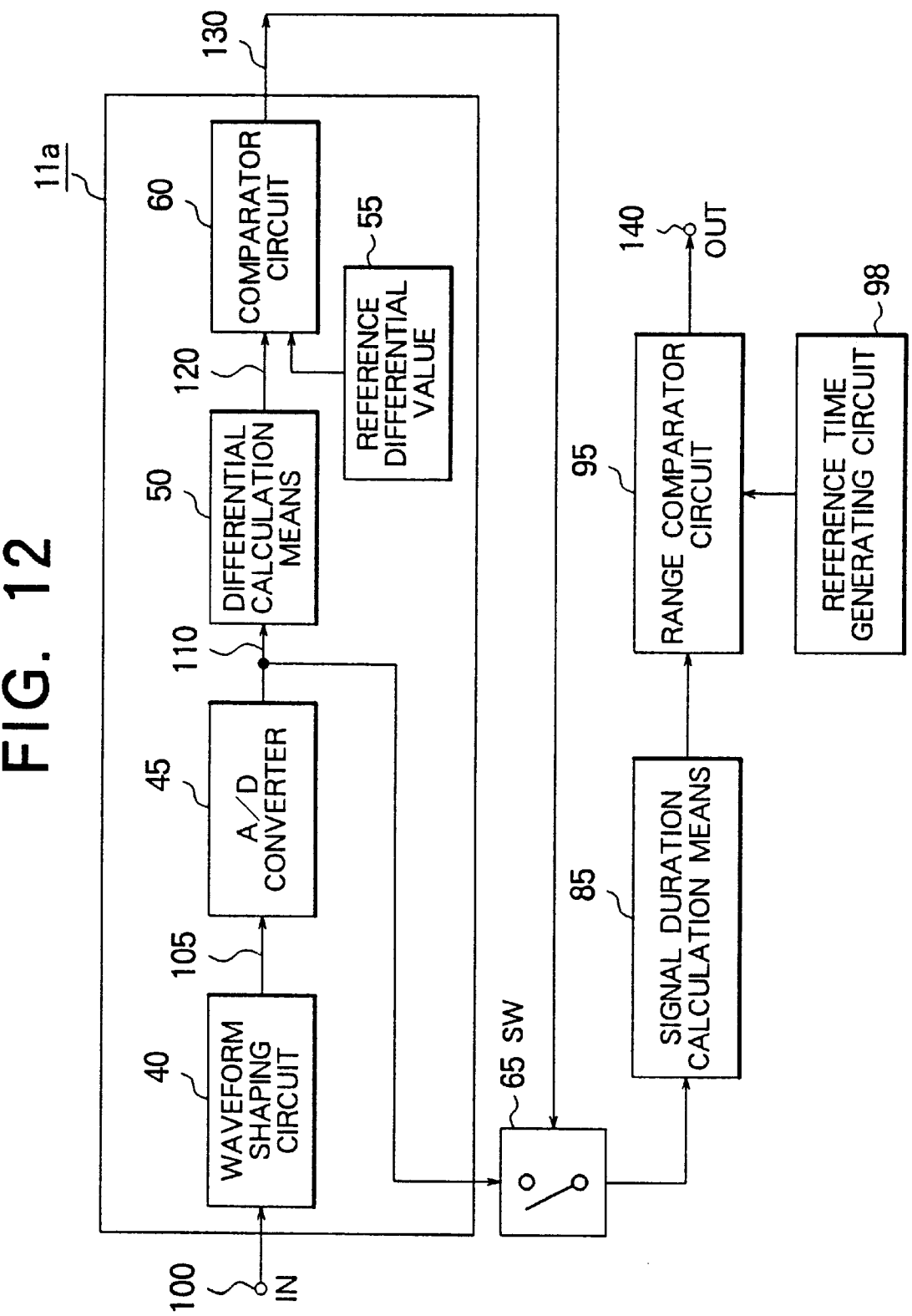
FIG. 12 is a functional block diagram showing a sixth embodiment of the present invention.

Hereinafter, this embodiment will be described with reference to FIG. 12. FIG. 12 is a block diagram showing the construction of an accident sound detection circuit according to this embodiment. In addition, in the figure, the same numerals are assigned to blocks that are the same as or equivalent to those in FIG. 7.

In the figure, numeral 85 shows signal duration calculation means for calculating the duration of a signal acquired from the A/D converter 45 via the switch 80. Further, 95 is a comparator circuit performing level comparison of a signal, which shows the reference time value and is outputted from a reference time value generating circuit 98 generating a reference duration value preset according to the kind of the accident sound, and an output signal, which shows signal duration and is outputted from the signal duration calculation means 85.

Next, the operation of this embodiment will be described with reference to FIG. 12. Since the operation of the accident sound detection block 11a is the same as that of the accident sound detection circuit 11 belonging to the first embodiment, the detailed description of it is omitted.

An inputted sound signal 100 of an accident sound and the like is discriminated as an accident sound in the first discrimination using the accident sound detection block 11a, and the accident sound detection signal 130 is generated. In this time, the accident sound detection signal 130 is inputted as a trigger signal to the switch 65, and turns on the switch 65. In consequence, the output signal 110 from the A/D converter 45 in the accident sound detection block 11a is sent to the signal duration calculation means 85. The signal duration calculation means 85 calculates the signal duration of the inputted output signal.

The calculation result is inputted to a range comparator circuit 95 comparing ranges of duration, where the range of the calculated signal duration is compared to that of the reference duration preset in the reference duration generating circuit 98 according to the kind of the accident sound. For example, assuming that the signal duration is 50 msec, a range of 10 msec to 100 msec is preset as the reference duration. Then, whether the signal duration of a sound signal matches with this range is judged.

In this manner, the signal duration of the inputted sound signal and the reference duration are compared with the range comparator circuit 95. If the signal duration of the inputted signal is within the range of the preset reference duration, the inputted signal is judged to be a sudden accident sound, and the range comparator circuit 95 outputs the final accident sound detection signal 140.

The reason why the range comparison of the signal duration of the sound signal 110 and the reference duration is performed is to increase the efficiency of accident sound discrimination. Thus, generally, an accident sound is an impactive signal, and happens instantaneously in many cases. For example, however, a klaxon sound and the like for alarming has longer duration than that of the accident sound in many cases. Hence, it is possible to efficiently discriminate the accident sound from other traffic sounds by comparing the ranges of the signal duration and the reference duration.

In this manner, this embodiment, as the first discrimination, acquires an accident sound by setting the accident sound detection signal by the accident sound detection block 11a as a trigger signal, and further performs the content discrimination of the accident sound by the second discrimination using range comparison on the signal duration. Therefore, it is possible to efficiently and selectively detect the traffic accident sound.

In addition, although, in FIG. 12, the accident sound detection circuit 11A of FIG. 1 is described instead of the accident sound detection block 11a as an example, it is also good to use the accident sound detection circuits 11B and 11C shown in FIGS. 3 and 5. Moreover, although, in FIG. 12, the signal duration calculation means 85 receives the output signal 110 of the A/D converter 45 in the accident sound detection block 11a, the means 85 can also receive the output signal of the signal smoothing means 46 shown in FIG. 3.

Embodiment 7

Each of the above-mentioned fourth and fifth embodiments identifies an accident sound from an inputted sound signal according to a spectrum pattern and an auto-correlation pattern. In the sound signal detected in the vicinity of an intersection, however, sound signals having various frequency bands and levels are intermixed, and hence it is difficult to identify the accident sound in high precision only with the process result of a single sound signal. Then, this embodiment identifies the accident sound from the inputted sound signal by using both of a spectrum pattern and an auto-correlation pattern of the signal.

Figure 13:
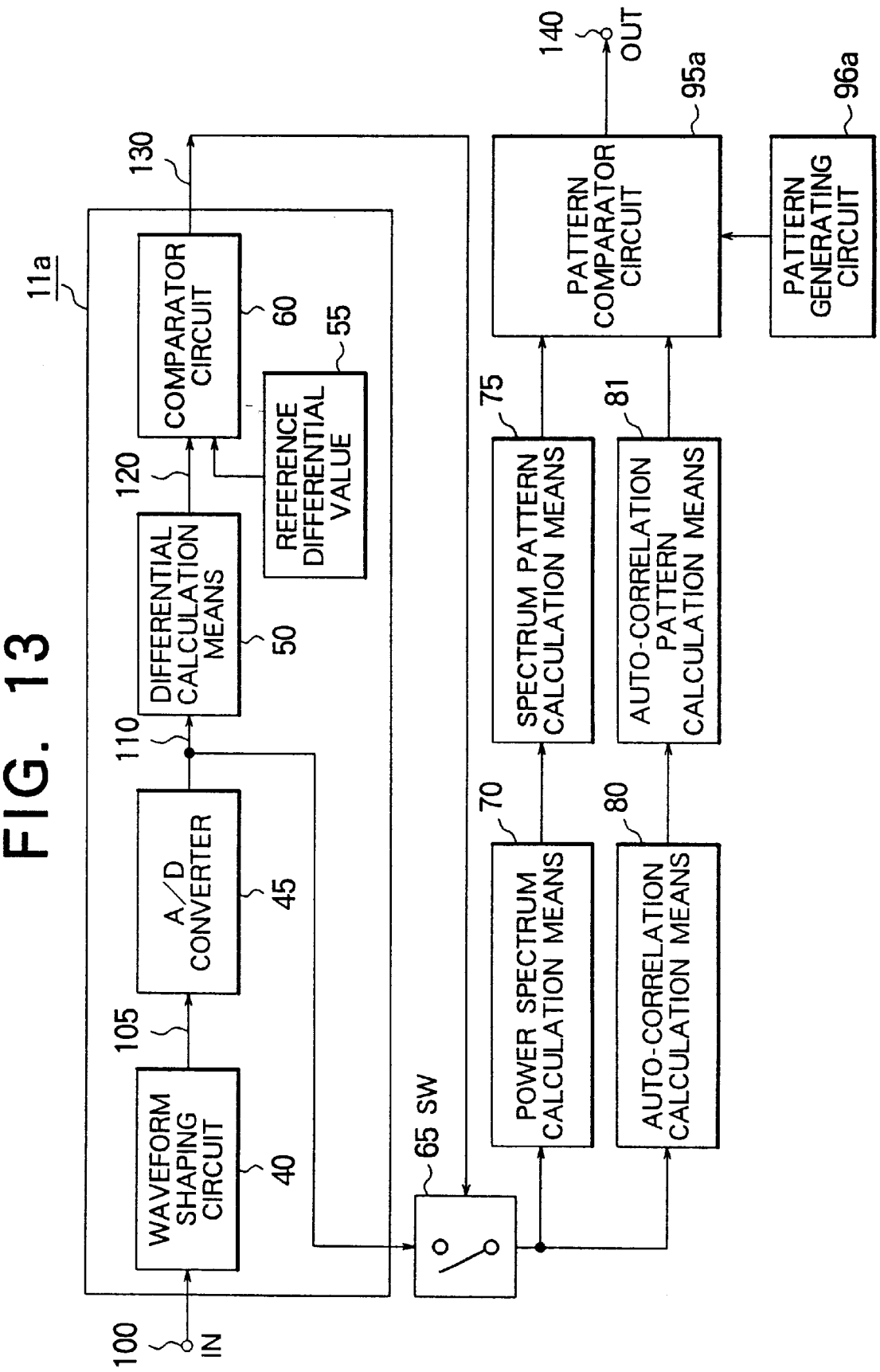
FIG. 13 is a functional block diagram showing a seventh embodiment of the present invention.

Hereinafter, this embodiment will be described with reference to drawings. FIG. 13 is a block diagram showing the construction of an accident sound detection circuit according to this embodiment. In addition, in the figure, the same numerals are assigned to blocks that are the same as or equivalent to those in FIGS. 7 and 11. In the figure, numeral 80 shows auto-correlation calculation means calculating an auto-correlation function or an auto-correlation coefficient of the output signal 110 acquired from the A/D converter 45 through the switch 65. Further, 81 is auto-correlation pattern calculation means for patterning the result of the auto-correlation calculation by the auto-correlation calculation means 80.

In addition, 95a is a pattern comparator circuit, which performs pattern comparison by using a signal from a pattern generating circuit 96a generating a pattern preset according to the kind of the accident sound and output signals from the spectrum pattern calculation means 75 and the auto-correlation pattern calculation means 81.

Next, the operation of this embodiment will be described with reference to FIG. 13. Since the operation of the accident sound detection block 11a is the same as that of the accident sound detection circuit 11 belonging to the first embodiment, the detailed description of it is omitted. An inputted sound signal such as an accident sound and the like is discriminated as an accident sound by the accident sound detection block 11a in the first discrimination, and the accident sound detection signal 130 is generated. In this time, the accident sound detection signal 130 is inputted as a trigger signal to the switch 65, and turns on the switch 65.

In consequence, the output signal 110 from the A/D converter 45 in the accident sound detection block 11a is sent to the power spectrum calculation means 70 and the auto-correlation calculation means 80 through the switch 65. The power spectrum calculation means 70 saves the inputted output signal 110 in memory while the calculation means 70 performs power spectrum calculation by using a saved signal within a predetermined period. This calculation result is sent to the spectrum pattern calculation means 75, and a spectrum pattern is generated in regard to subbands that are divided small frequency domains.

On the other hand, the auto-correlation calculation means 80 saves the inputted output signal 110 in memory while the calculation means 80 calculates an auto-correlation function or an auto-correlation coefficient by using a saved signal within a predetermined period. This calculation result is sent to the auto-correlation pattern calculation means 81, and a pattern regarding auto-correlation values is generated.

Next, these spectrum pattern and auto-correlation pattern are inputted to the pattern comparator circuit 95a, and are compared to a set pattern preset by a pattern generating circuit 96a according to the kind of the accident sound. If the spectrum pattern and auto-correlation pattern that are inputted coincide with a pattern set in the pattern generating circuit 96a, the inputted signal is judged to be an accident sound, and the final accident sound detection signal 140 is outputted from the pattern comparator circuit 95a.

Figure 14:
FIG. 14 is an explanatory diagram of the operation of an example embodying a pattern comparison method in a pattern comparator circuit shown in FIG. 13.

FIG. 14 is an explanatory diagram showing an example of comparison operation of a spectrum pattern and an auto-correlation pattern that are inputted to the pattern comparator circuit 95 and a preset pattern. In FIG. 14, it is assumed that a subband is generally expressed as SBi (i=1, . . . , N) and a domain of a correlation function is CORi (i=1, 2), and an inputted pattern to the pattern comparator circuit is two-dimensionally expressed by pattern 2. Then, the inputted pattern coincides with the set pattern, and hence it can be discriminated that the inputted sound is an accident sound. On the other hand, if the inputted pattern is expressed as pattern 1, the inputted pattern is different from the set pattern, and hence the accident sound detection signal is not generated.

The reason why an inputted spectrum pattern and an auto-correlation pattern and a set pattern are compared is that various accident sounds have characteristic patterns regarding the spectrum pattern and auto-correlation pattern. For this reason, by selecting a pattern to be detected as a set pattern, a sound signal having a pattern coinciding with the set pattern is discriminated as an accident sound.

Although, in FIG. 14, a pattern of a correlation function is CORi (i=1, 2), it is also good that the pattern is CORi (i=1, 2, . . . , N).

In this manner, this seventh embodiment, as the first discrimination, acquires an accident sound by setting the accident sound detection signal by the accident sound detection block 11a as a trigger signal, and further performs the second discrimination of the accident sound by two-dimensional pattern comparison using a power spectrum and auto-correlation. Therefore, it is possible to efficiently and selectively detect the traffic accident sound.

In addition, although, in FIG. 13, the accident sound detection circuit 11A of FIG. 1 is described instead of the accident sound detection block 11a as an example, it is also good to use the accident sound detection circuits 11B and 11C shown in FIGS. 3 and 5. Moreover, although, in FIG. 11, the power spectrum calculation means 70 and auto-correlation calculation means 80 receive the output signal 110 from the A/D converter 45 in the accident sound detection block 11a, the means 70 and 80 can also receive the output signal of the signal smoothing means 46 shown in FIG. 3.

Embodiment 8

In the above-mentioned seventh embodiment, detection of an accident sound is defined as detection of a sound signal having a spectrum pattern and an auto-correlation pattern that are preset. In this embodiment, a preset signal duration pattern is used instead of the auto-correlation pattern, and detection of an accident sound is defined as detection of a sound signal having this signal duration pattern and a preset spectrum pattern.

Figure 15:
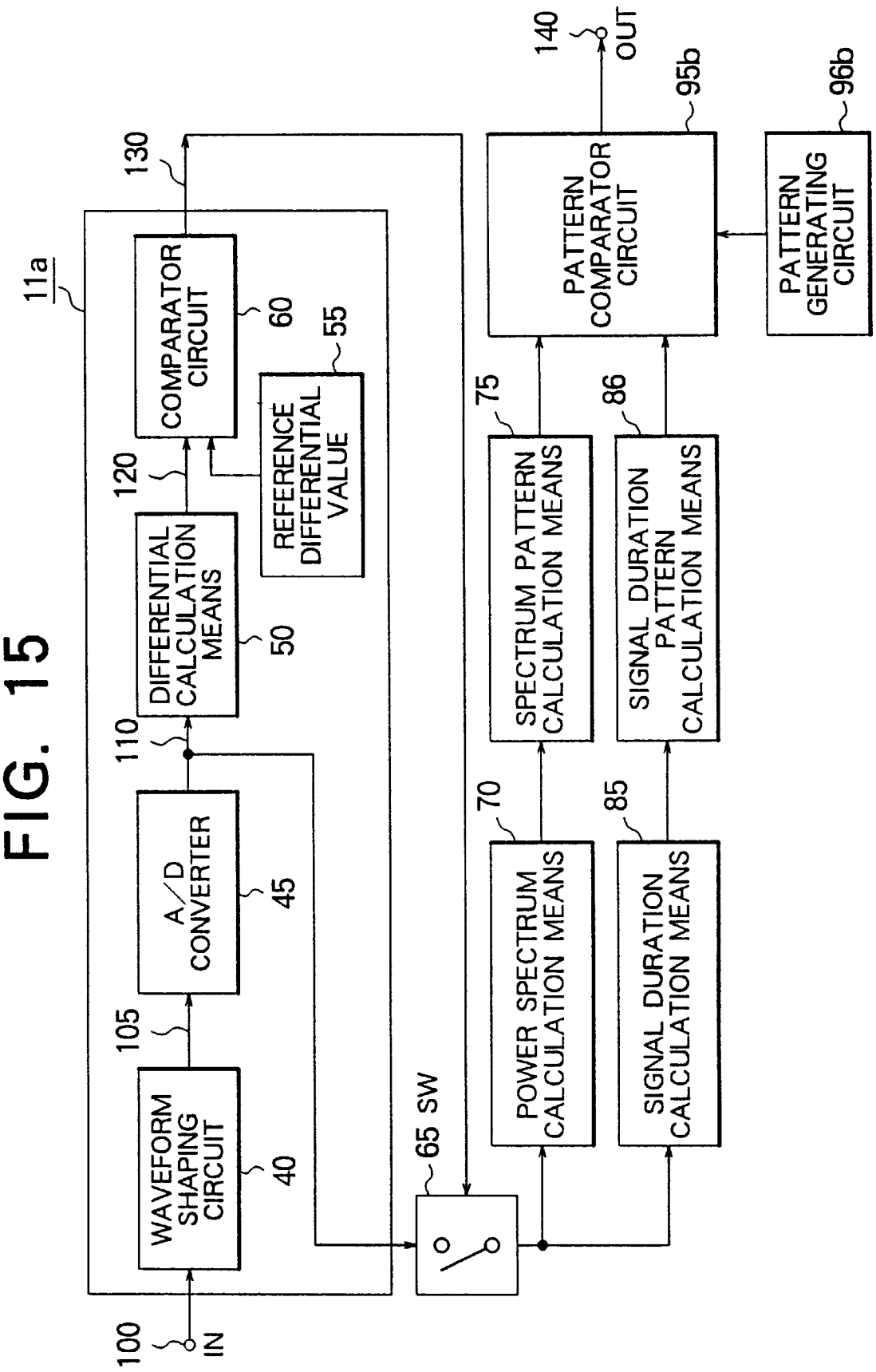
FIG. 15 is a functional block diagram showing an eighth embodiment of the present invention.

Hereinafter, this embodiment will be described with reference to drawings. FIG. 15 is a block diagram showing the construction of an accident sound detection circuit according to this embodiment. In addition, in the figure, the same numerals are assigned to blocks that are the same as or equivalent to those in FIGS. 12 and 13. In the figure, numeral 86 shows signal duration pattern calculation means for patterning the calculation result of signal duration by the signal duration calculation means 85.

In addition, 95b is a pattern comparator circuit, which performs pattern comparison by using a signal from the pattern generating circuit 96b generating a pattern preset according to the kind of the accident sound, and a spectrum pattern and a signal duration pattern from the spectrum pattern calculation means 75 and the signal duration pattern calculation means 86.

Next, the operation of this embodiment will be described with reference to FIG. 15. Since the operation of the accident sound detection block 11a is the same as that of the accident sound detection circuit 11 belonging to the first embodiment, the detailed description of it is omitted.

In FIG. 15, an inputted sound signal of an accident sound and the like is discriminated as an accident sound by the accident sound detection block 11a in the first discrimination, and the accident sound detection signal 130 is generated. The accident sound detection signal 130 is inputted as a trigger signal to the switch 65, and turns on the switch 65. In consequence, the output signal 110 from the A/D converter 45 in the accident sound detection block 11a is sent to the power spectrum calculation means 70 and the signal duration calculation means 85.

The power spectrum calculation means 70 saves the inputted output signal in memory while the calculation means 70 performs power spectrum calculation by using a saved signal within a predetermined period. This calculation result is sent to the spectrum pattern calculation means 75, and a spectrum pattern is generated in regard to subbands that are divided small frequency domains. On the other hand, the signal duration calculation means 85 calculates signal duration from the inputted output signal. This calculation result is sent to the signal duration pattern calculation means 86, and a pattern regarding the signal duration, that is, a duration pattern is generated.

Next, these spectrum pattern and duration pattern are inputted to the pattern comparator circuit 95b, and are compared to the set pattern preset by a pattern generating circuit 96b according to the kind of the accident sound. If the spectrum pattern and duration pattern that are inputted coincide with the pattern set in the pattern generating circuit 96b, the inputted signal is judged to be an accident sound, and the final accident sound detection signal 140 is outputted from the pattern comparator circuit 95b.

Figure 16:
FIG. 16 is an explanatory diagram of the operation of an example embodying a pattern comparison method in a pattern comparator circuit shown in FIG. 15.

FIG. 16 is an explanatory diagram showing an example of comparison operation of a spectrum pattern and a duration pattern that are inputted to the pattern comparator circuit 95 and a preset pattern. In FIG. 16, it is assumed that a subband is generally expressed as SBi (i=1, . . . , N) and a domain of duration is TLi (i=1, 2), and an inputted pattern to the pattern comparator circuit 95b is two-dimensionally expressed by pattern 2. Then, the inputted pattern coincides with the set pattern, and hence it can be discriminated that the inputted sound is an accident sound. On the other hand, if the inputted pattern is expressed as pattern 1, the inputted pattern is different from the set pattern, and hence the accident sound detection signal 140 is not generated.

Here, the reason why a spectrum pattern and a duration pattern, which are inputted, and a set pattern are compared is that various accident sounds have characteristic patterns regarding the spectrum pattern and duration pattern. For this reason, by setting a pattern to be detected as the preset pattern, it becomes possible to efficiently discriminate that the sound signal having patterns coinciding with the set pattern is an accident sound.

Although, in FIG. 16, a pattern of duration is TLi (i=1, 2), it is also good that the pattern is TLi (i=1, 2, . . . , N).

In this manner, this eighth embodiment, as the first discrimination, acquires an output signal 110 from the A/D converter 45 by setting the accident sound detection signal 130 outputted from the accident sound detection block 11a as a trigger signal, and further performs the second discrimination of the accident sound by two-dimensional pattern comparison using a power spectrum and signal duration. Therefore, it is possible to efficiently and selectively detect the traffic accident sound.

In addition, although, in FIG. 15, the accident sound detection circuit 11A of FIG. 1 is described instead of the accident sound detection block 11a as an example, it is also good to use the accident sound detection circuits 11B and 11C shown in FIGS. 3 and 5. Moreover, although, in FIG. 15, the power spectrum calculation means 70 and signal duration calculation means 85 receive the output signal 110 from the A/D converter 45 in the accident sound detection block 11a, the means 70 and 85 can also receive the output signal of the signal smoothing means 46 shown in FIG. 3.

Embodiment 9

In the above-mentioned eighth embodiment, detection of an accident sound is defined as detection of a sound signal having a spectrum pattern and a signal duration pattern that are preset. In this embodiment, however, a preset auto-correlation pattern is used instead of the spectrum pattern, and detection of an accident sound is defined as detection of a sound signal having this auto-correlation pattern and a set signal duration pattern.

Figure 17:
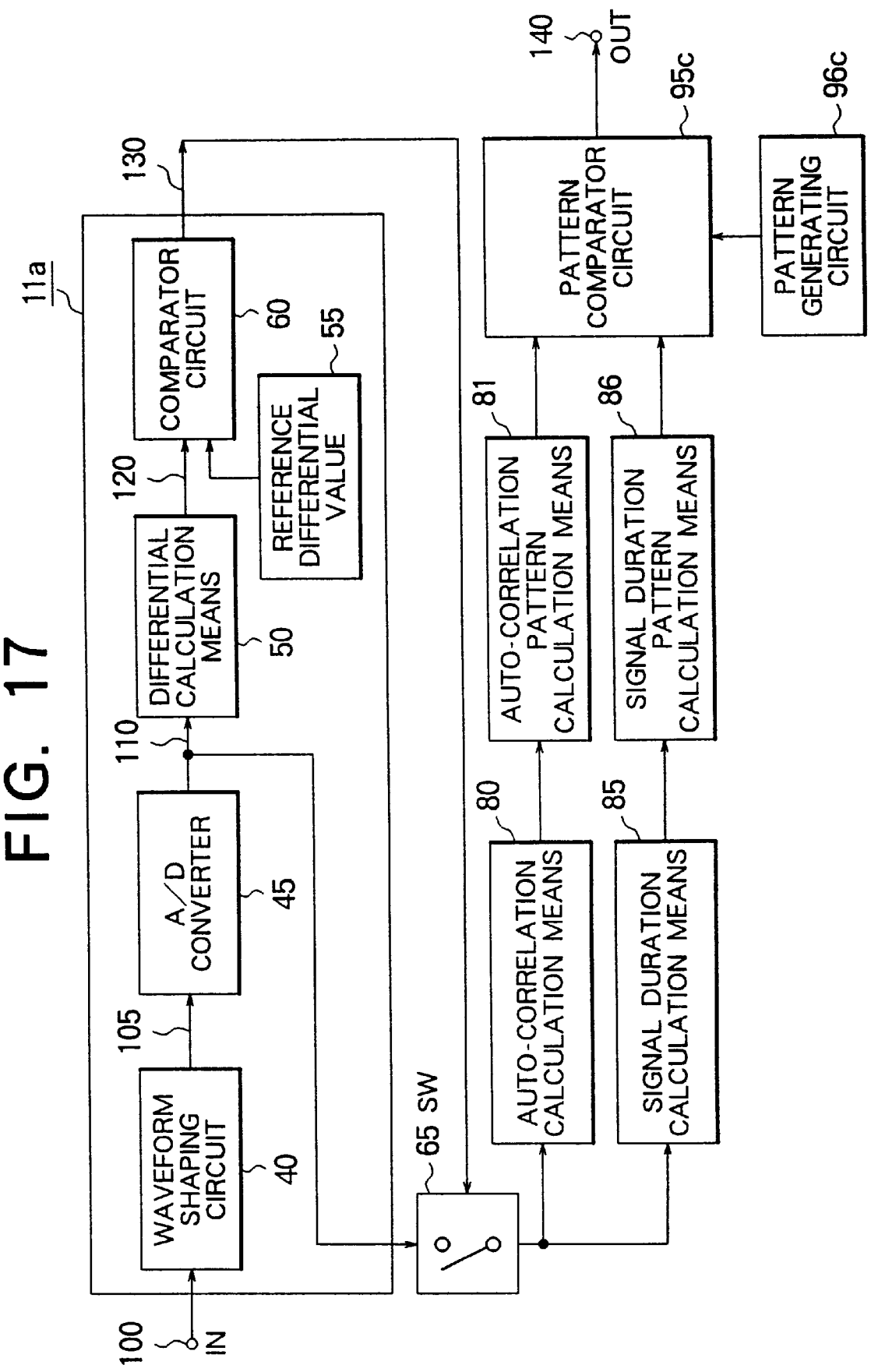
FIG. 17 is a functional block diagram showing a ninth embodiment of the present invention.

Hereinafter, this embodiment will be described with reference to drawings. FIG. 17 is a block diagram showing the construction of an accident sound detection circuit according to this embodiment. In addition, in the figure, the same numerals are assigned to blocks that are the same as or equivalent to those in FIGS. 13 and 15. In the figure, 95c is a pattern comparator circuit, which performs pattern comparison by using a signal from a pattern generating circuit 96c generating a pattern preset according to the kind of the accident sound, and pattern signals from the auto-correlation pattern calculation means 81 and the signal duration pattern calculation means 86.

Next, the operation of this embodiment will be described with reference to FIG. 17. Since the operation of the accident sound detection block 11a is the same as that of the accident sound detection circuit 11 belonging to the first embodiment, the detailed description of it is omitted.

An inputted sound signal 100 of an accident sound and the like is discriminated as an accident sound by the accident sound detection block 11a in the first discrimination, and the accident sound detection signal 130 is generated. The accident sound detection signal 130 is inputted as a trigger signal to the switch 65, and turns on the switch 65. In consequence, the digital output signal 110 from the A/D converter 45 in the accident sound detection block 11a is sent to the auto-correlation calculation means 80 and the signal duration calculation means 85.

The auto-correlation calculation means 80 saves the inputted output signal in memory while the calculation means 80 calculates an auto-correlation function or auto-correlation coefficient by using a saved signal within a predetermined period. This calculation result is sent to the auto-correlation pattern calculation means 81, and a pattern regarding auto-correlation values is generated. On the other hand, the signal duration calculation means 85 calculates signal duration from the inputted output signal. Furthermore, this calculation result is sent to the signal duration pattern calculation means 86, and a pattern regarding the signal duration is calculated.

Next, these auto-correlation pattern and duration pattern are inputted to the pattern comparator circuit 95c, and are compared to the set pattern preset by a pattern generating circuit 96c according to the kind of the accident sound. If the auto-correlation pattern and signal duration pattern that are inputted coincide with a pattern set in the pattern generating circuit 96c, the inputted signal is judged to be an accident sound, and the final accident sound detection signal 140 is outputted from the pattern comparator circuit 95c.

Figure 18:
FIG. 18 is an explanatory diagram of the operation of an example embodying a pattern comparison method in a pattern comparator circuit shown in FIG. 17.

FIG. 18 is an explanatory diagram showing an example of comparison operation of an auto-correlation pattern and a signal duration pattern that are inputted to the pattern comparator circuit 95c and a preset pattern. In FIG. 18, it is assumed that a domain of a correlation function is CORi (i=1, 2) and a domain of duration is TLi (i=1, 2, ..., N), and an inputted pattern to the pattern comparator circuit 95c is two-dimensionally expressed by pattern 2. Then, the inputted pattern coincides with the set pattern, and hence it can be discriminated that the inputted sound is an accident sound. On the other hand, if the inputted pattern is expressed as pattern 1, the inputted pattern is different from the set pattern, and hence the accident sound detection signal is not generated.

Here, the reason why an auto-correlation pattern and a signal duration pattern, which are inputted, and a set pattern are compared is that various accident sounds have characteristic patterns regarding the auto-correlation pattern and signal duration pattern. For this reason, by setting a pattern to be detected as the preset pattern, it becomes possible to efficiently discriminate that the sound signal having a pattern coinciding with the set pattern is an accident sound.

Although, in FIG. 18, a pattern of a correlation function is CORi (i=1, 2), it is also good generally that the pattern is CORi (i=1, 2, ..., N).

In this manner, this ninth embodiment, as the first discrimination, acquires an accident sound by setting the accident sound detection signal 130 by the accident sound detection block 11a as a trigger signal, and further performs the second discrimination of the accident sound by two-dimensional pattern comparison using auto-correlation and signal duration. Therefore, it is possible to efficiently and selectively detect the traffic accident sound.

In addition, although, in FIG. 17, the accident sound detection circuit 11A of FIG. 1 is described instead of the accident sound detection block 11a as an example, it is also good to use the accident sound detection circuits 11B and 11C shown in FIGS. 3 and 5. Moreover, although, in FIG. 17, the auto-correlation calculation means 80 and signal duration calculation means 85 receive the output signal 110 from the A/D converter 45 in the accident sound detection block 11a, the means 80 and 85 can also receive the output signal of the signal smoothing means 46 shown in FIG. 3.

Embodiment 10

The above-mentioned seventh, eighth, and ninth embodiments detect an accident sound from a sound signal on the basis of two patterns which are selected among a spectrum pattern, an auto-correlation pattern, and a signal duration pattern. It, however, is also good to detect the accident sound on the basis of three patterns of the spectrum pattern, auto-correlation pattern, and signal duration pattern.

Figure 19:
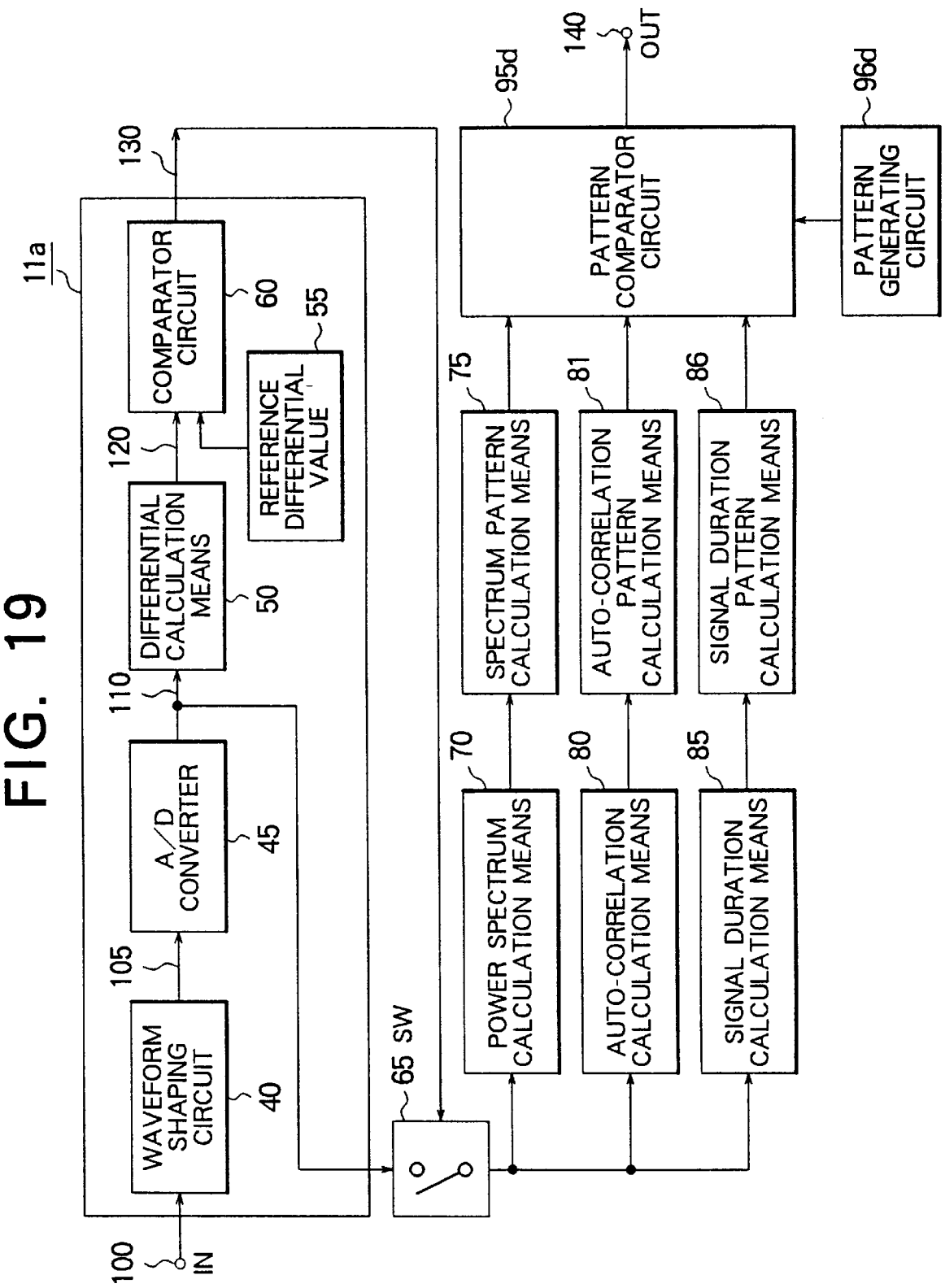
FIG. 19 is a functional block diagram showing a tenth embodiment of the present invention.

Hereinafter, this embodiment will be described with reference to drawings. FIG. 19 is a block diagram showing the construction of an accident sound detection circuit according to this embodiment. Furthermore, in the figure, the same numerals are assigned to blocks that are the same as or equivalent to those in FIGS. 15 and 17. In FIG. 19, 95d is a pattern comparator circuit, which performs pattern comparison by using a signal from a pattern generating circuit 96d generating a pattern preset according to the kind of the accident sound, an output signal from the spectrum pattern calculation means 75, and pattern signals from the auto-correlation pattern calculation means 81 and the signal duration pattern calculation means 86.

Next, the operation of this embodiment will be described with reference to FIG. 19. Since the operation of the accident sound detection block 11c is the same as that of the accident sound detection circuit 11 belonging to the first embodiment, the detailed description of it is omitted.

In FIG. 19, an inputted sound signal of an accident sound and the like is discriminated as an accident sound by the accident sound detection block 11a in the first discrimination, and the accident sound detection signal 130 is generated. In this time, the accident sound detection signal 130 is inputted as a trigger signal to the switch 65, and turns on the switch 65. In consequence, the output signal 110 from the A/D converter 45 in the accident sound detection block 11a is sent to the power spectrum calculation means 70, auto-correlation calculation means 80, and the signal duration calculation means 85.

The power spectrum calculation means 70 saves the inputted output signal in memory while the calculation means 70 performs power spectrum calculation by using a saved signal within a predetermined period. This calculation result is sent to the spectrum pattern calculation means 75, and a spectrum pattern is generated in regard to subbands that are divided small frequency domains.

The auto-correlation calculation means 80, similarly to the power spectrum calculation means 70, saves the inputted output signal in memory while the calculation means 80 calculates an auto-correlation function or an auto-correlation coefficient by using a saved signal within a predetermined period. Further, this calculation result is sent to the auto-correlation pattern calculation means 81, and a pattern regarding auto-correlation values is generated. On the other hand, the signal duration calculation means 85 calculates signal duration from the inputted output signal. Furthermore, this calculation result is sent to the signal duration pattern calculation means 86, and a pattern regarding the signal duration is generated.

Next, these spectrum pattern, auto-correlation pattern and signal duration pattern are inputted to the pattern comparator circuit 95d, and are compared to a set pattern preset by the pattern generating circuit 96d according to the kind of the accident sound. If the power spectrum pattern, auto-correlation pattern, and signal duration pattern that are inputted coincide with the pattern set in the pattern generating circuit 96d, the inputted signal is judged to be an accident sound, and the final accident sound detection signal 140 is outputted from the pattern comparator circuit 95d.

Figure 20:
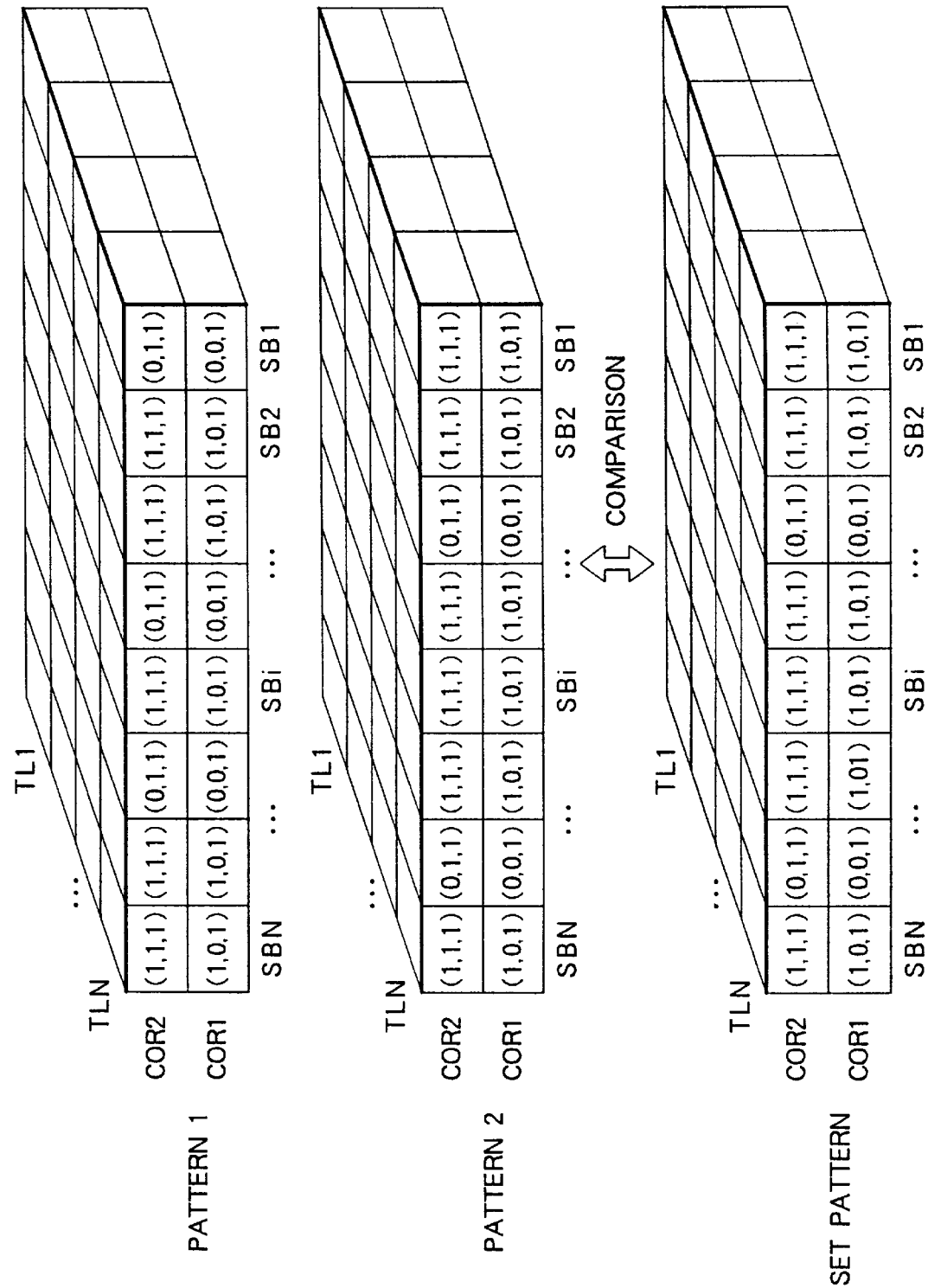
FIG. 20 is an explanatory diagram of the operation of an example embodying a pattern comparison method in a pattern comparator circuit shown in FIG. 19.

FIG. 20 is an explanatory diagram showing an example of comparison operation of a power spectrum pattern, an auto-correlation pattern, and a signal duration pattern that are inputted to the pattern comparator circuit 95 and a preset pattern. In FIG. 20, it is assumed that a subband is generally SBi (i=1, . . . , N), a domain of a correlation function is CORi (i=1, 2) and a domain of duration is TLi (i=1, 2, . . . , N), and an inputted pattern to the pattern comparator circuit 95d is three-dimensionally expressed by pattern 2. Then, the inputted pattern coincides with the set pattern, and hence it can be discriminated that the inputted sound is an accident sound. On the other hand, if the inputted pattern is expressed as pattern 1, the inputted pattern is different from the set pattern, and hence the accident sound detection signal is not generated.

Here, the reason why a power spectrum pattern, an auto-correlation pattern, and a signal duration pattern, and a set pattern are compared is that various accident sounds generally have characteristic patterns regarding the power spectrum pattern, auto-correlation pattern, and signal duration pattern. For this reason, by setting a pattern to be detected as the preset pattern, it becomes possible to efficiently discriminate that a pattern coinciding with the set pattern is an accident sound.

In addition, although, in FIG. 20, a pattern of a correlation function is CORi (i=1, 2), it is also good generally that the pattern is CORi (i=1, 2, . . . , N).

In this manner, this tenth embodiment, as the first discrimination, acquires an accident sound by setting the accident sound detection signal 130 by the accident sound detection block 11a as a trigger signal, and further performs the second discrimination by three-dimensional pattern comparison using power spectrum, auto-correlation, and signal duration. Therefore, it is possible to efficiently and selectively detect the traffic accident sound.

In addition, although, in FIG. 19, the accident sound detection circuit 11A of FIG. 1 is described instead of the accident sound detection block 11a as an example, it is also good to use the accident sound detection circuits 11B and 11C shown in FIGS. 3 and 5. Moreover, although, in FIG. 19, the power spectrum calculation means 70, auto-correlation calculation means 80, and signal duration calculation means 85 receive the output signal 110 from the A/D converter 45 in the accident sound detection block 11a, the means 70, 80, and 85 can also receive the output signal of the signal smoothing means 46 shown in FIG. 3.

Although, in each of the above-mentioned first to tenth embodiments, a circuit embodying each function is shown in a block diagram, the blocks digitized in this block diagram can be embodied with any method of hardware configuration or software processing.

What is claimed is:

1. An accident sound detection circuit for detecting an accident sound by using a sound signal produced by an environmental sound detection unit located in the vicinity of a road, the accident sound detection circuit comprising:

an analog-to-digital (A/D) converter for converting a sound signal from an environmental sound detection unit into a digital sound signal;

differential calculation means for generating an acquired differential signal from an output signal of said A/D converter;

a reference differential value generating circuit for generating a reference differential value;

a first comparator circuit for comparing the acquired differential signal to the reference differential value, detecting an accident sound from a comparison of the acquired differential signal to the reference differential value, and generating an accident sound detection signal in response to detecting an accident sound; and auto-correlation calculation means for auto-correlation of the digital sound signal received from the A/D converter when an accident sound detection signal is input;

a correlation reference value generating circuit for setting an auto-correlation reference value of a sound signal for discriminating among different kinds of accident sounds; and a second comparator circuit for comparing the auto-correlation reference value and the auto-correlation of the digital sound signal and for generating a final accident sound detection signal in response to the comparison of auto-correlation of the digital sound signal and the reference value.

2. An accident sound detection circuit for detecting an accident sound by using a sound signal produced by an environmental sound detection unit located in the vicinity of a road, the accident sound detection circuit comprising:

an analog-to-digital (A/D) converter for converting a sound signal from an environmental sound detection unit into a digital sound signal;

differential calculation means for generating an acquired differential signal from an output signal of said A/D converter;

a reference differential value generating circuit for generating a reference differential value;

a first comparator circuit for comparing the acquired differential signal to the reference differential value, detecting an accident sound from a comparison of the acquired differential signal to the reference differential value, and generating an accident sound detection signal in response to detecting an accident sound;

signal duration calculation means for obtaining signal duration of the digital sound signal received from the A/D converter when an accident sound detection signal is input;

a reference time setting circuit for setting a reference signal duration of a sound signal for discriminating among different kinds of accident sounds; and a second comparator circuit for generating a final accident sound detection signal in response to comparison of the signal duration and the reference signal duration.

3. An accident sound detection circuit for detecting an accident sound by using a sound signal produced by an environmental sound detection unit located in the vicinity of a road, the accident sound detection circuit comprising:

an analog-to-digital (A/D) converter for converting a sound signal from an environmental sound detection unit into a digital sound signal;

differential calculation means for generating an acquired differential signal from an output signal of said A/D converter;

a reference differential value generating circuit for generating a reference differential value;

a comparator circuit for comparing the acquired differential signal to the reference differential value, detecting an accident sound from a comparison of the acquired differential signal to the reference differential value, and generating an accident sound detection signal in response to detecting an accident sound;

auto-correlation calculation means for obtaining auto-correlation of the digital sound signal received from the A/D converter when an accident sound detection signal is input;

auto-correlation pattern calculation means for calculating a generated auto-correlation pattern of the digital sound signal;

signal duration calculation means for calculating signal duration of the digital sound signal;

signal duration pattern calculation means for generating a pattern of the signal duration;

a pattern generating circuit for generating an established auto-correlation pattern for discriminating among different kinds of accident sounds and an established signal duration; and a pattern comparator circuit comparing each of the established auto-correlation pattern and the established pattern of signal duration to each of the generated auto-correlation pattern and the generated pattern of signal duration and generating a final accident sound detection signal when the generated and established auto-correlation patterns and the generated and established signal duration patterns coincide.

* * * * *